(12) United States Patent
Vinmani et al.

(10) Patent No.: US 10,210,843 B2
(45) Date of Patent: Feb. 19, 2019

(54) METHOD AND SYSTEM FOR ADAPTING CONTENT ON HMD BASED ON BEHAVIORAL PARAMETERS OF USER

(71) Applicant: Brillio LLC, Jersey City, NJ (US)

(72) Inventors: Karthik Gopalakrishnan Vinmani, Bangalore (IN); Gaurav Jain, Bangalore (IN); Renji Kuruvilla Thomas, Bangalore (IN); Arun Kumar Vijaya Kumar, Bangalore (IN); Karthikeya Sivaprasad Alpuri, Bangalore (IN)

(73) Assignee: Brillio LLC, Jersey City, NJ (US)

( * ) Notice: Subject to any disclaimer, the term of this patent is extended or adjusted under 35 U.S.C. 154(b) by 190 days.

(21) Appl. No.: 15/342,666

(22) Filed: Nov. 3, 2016

(65) Prior Publication Data
US 2017/0371411 A1    Dec. 28, 2017

(30) Foreign Application Priority Data

Jun. 28, 2016   (IN) .............................. 201641022094

(51) Int. Cl.
| | | |
|---|---|---|
| *G06F 3/01* | (2006.01) | |
| *G09G 5/14* | (2006.01) | |
| *G09G 5/377* | (2006.01) | |
| *G06F 3/147* | (2006.01) | |

(52) U.S. Cl.
CPC ............ *G09G 5/14* (2013.01); *G06F 3/011* (2013.01); *G06F 3/147* (2013.01); *G09G 5/377* (2013.01); *G09G 2340/12* (2013.01); *G09G 2354/00* (2013.01)

(58) Field of Classification Search
CPC ............... G06F 3/015; G09G 2320/08; G09G 2340/12; G09G 2354/00; G09G 5/14; G09G 5/377
See application file for complete search history.

(56) References Cited

U.S. PATENT DOCUMENTS

| | | |
|---|---|---|
| 5,997,439 A | 12/1999 | Ohsuga et al. |
| 6,623,428 B2 | 9/2003 | Miller et al. |
| 8,292,797 B2 | 10/2012 | Chapman et al. |
| 8,531,354 B2 | 9/2013 | Woodard |
| 2002/0128540 A1 | 9/2002 | Kim et al. |
| 2002/0128541 A1 | 9/2002 | Kim et al. |
| 2010/0245237 A1 | 9/2010 | Nakamura |
| 2012/0194648 A1 | 8/2012 | Hofshi |
| 2014/0268356 A1 | 9/2014 | Bolas et al. |

(Continued)

FOREIGN PATENT DOCUMENTS

| | | |
|---|---|---|
| CN | 103405239 A | 11/2013 |
| CN | 104615243 A | 5/2015 |
| WO | 2014056000 A1 | 4/2014 |

*Primary Examiner* — Afroza Chowdhury

(57) ABSTRACT

Embodiments herein provide a method for automatically adapting content on a HMD device. The method includes receiving the vital parameters of the user while viewing an immersive view of the content on the HMD device. Further, the method includes determining that the vital parameters of the user meet a threshold criteria. Further, the method includes generating a modified immersive view including at least one visual element of the content modified based on the behavioral parameters of the user. Further, the method includes causing to display modified immersive view on the HMD device.

41 Claims, 16 Drawing Sheets

Current Graphical View

The user experiences health issues while viewing the tree and water content in the current graphical view due to the enhanced depth effects Modified Current Graphical View In the modified graphical view the tree and water content is modified based on the behavioural parameters of the user

(56) References Cited

U.S. PATENT DOCUMENTS

2014/0315169 A1 10/2014 Bohbot
2014/0316192 A1 10/2014 de Zambotti et al.
2016/0054565 A1* 2/2016 Izumihara ............... G09G 5/00
 345/8
2016/0086386 A1 3/2016 Son et al.

* cited by examiner

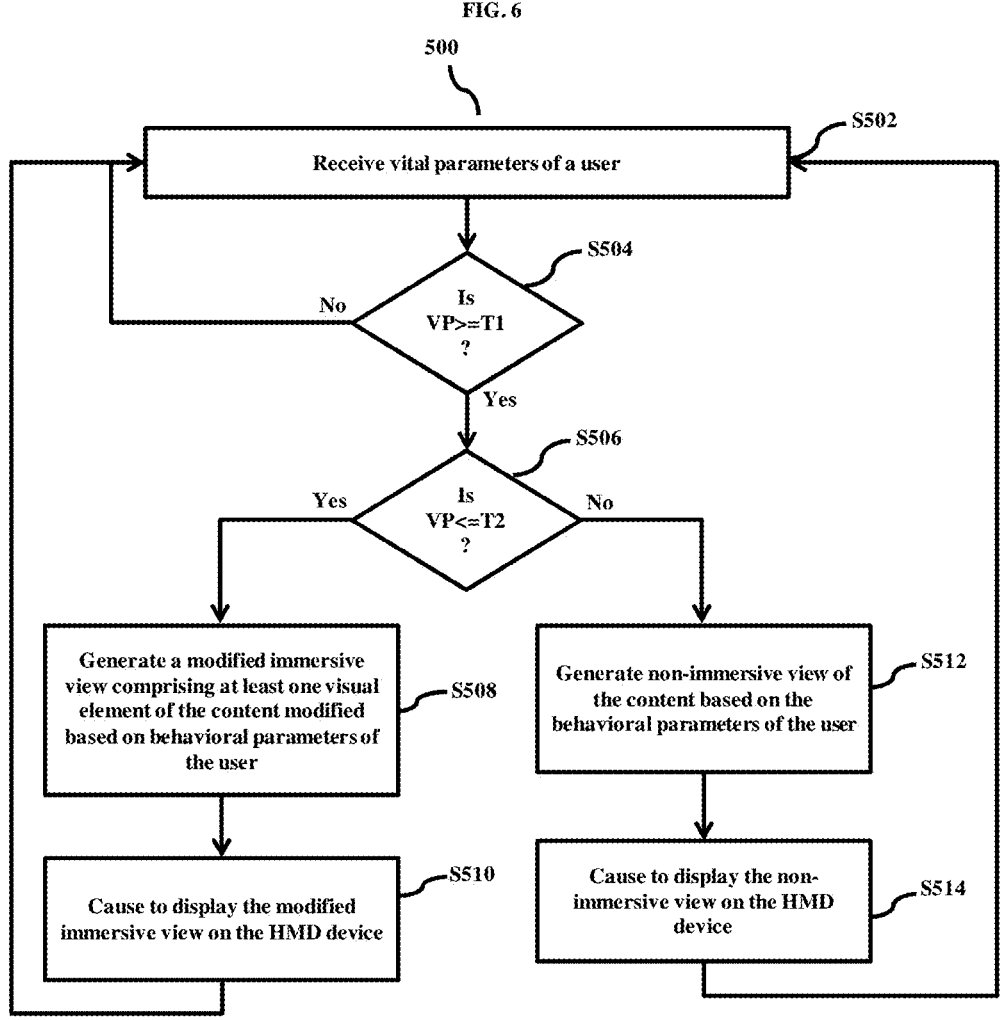

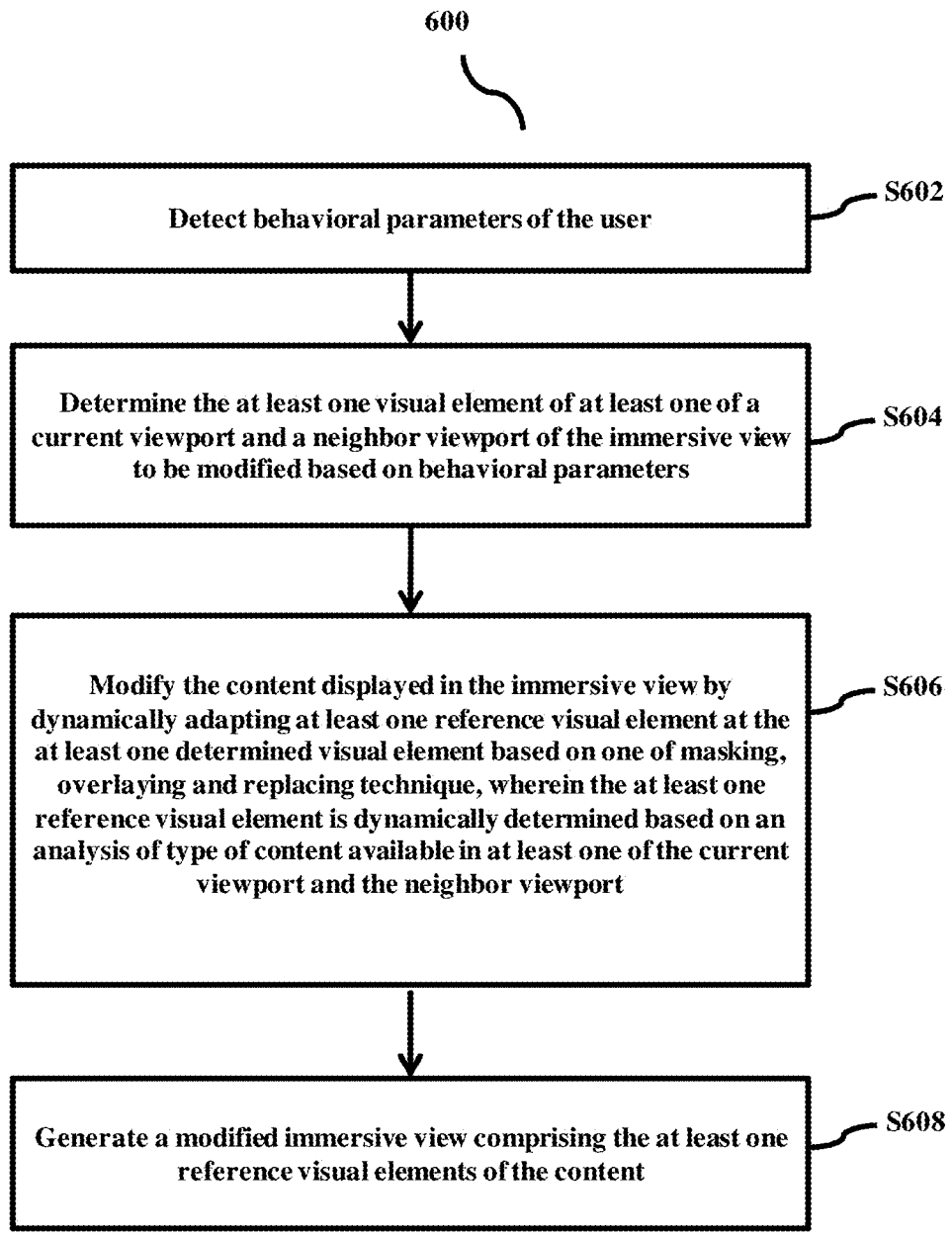

Modified Current Graphical View

In the modified graphical view the tree and water content is modified based on the behavioural parameters of the user

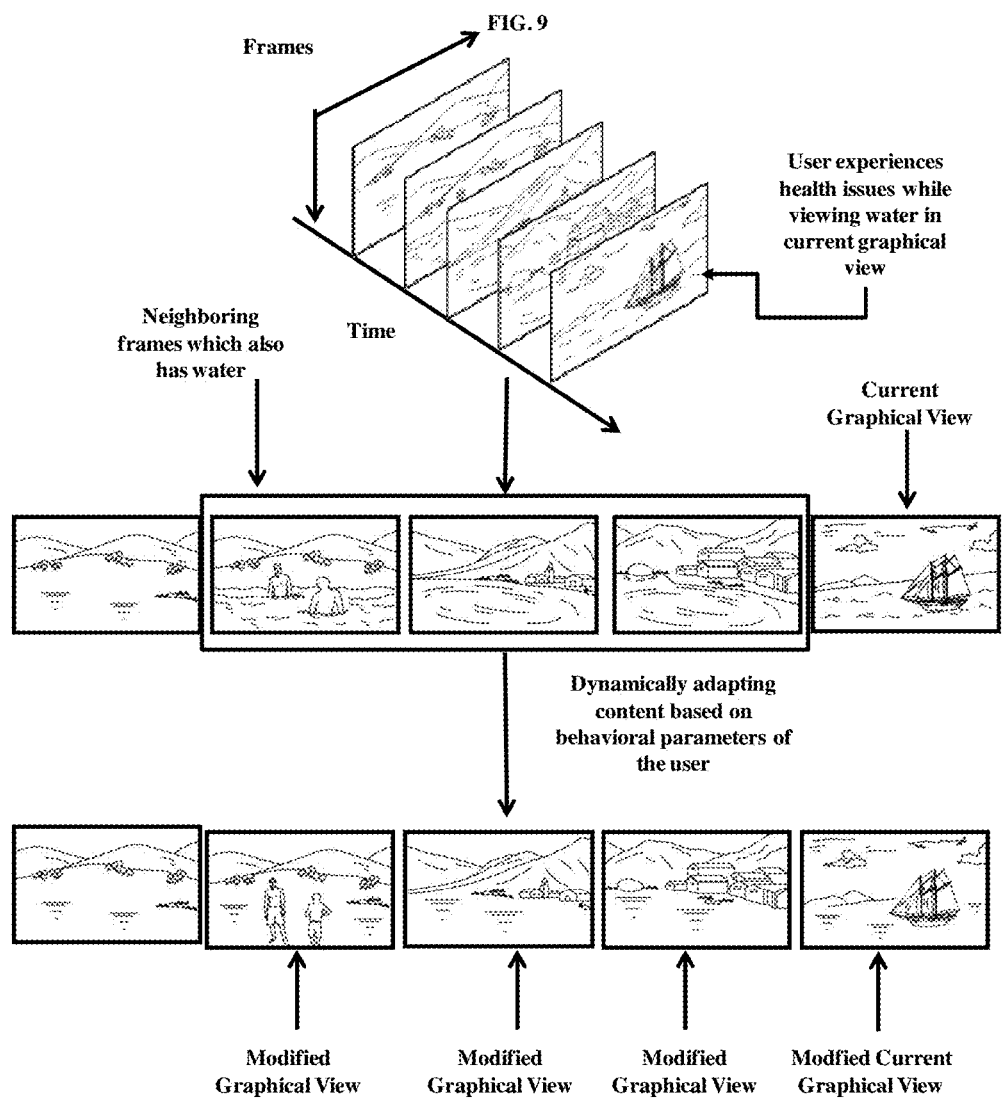

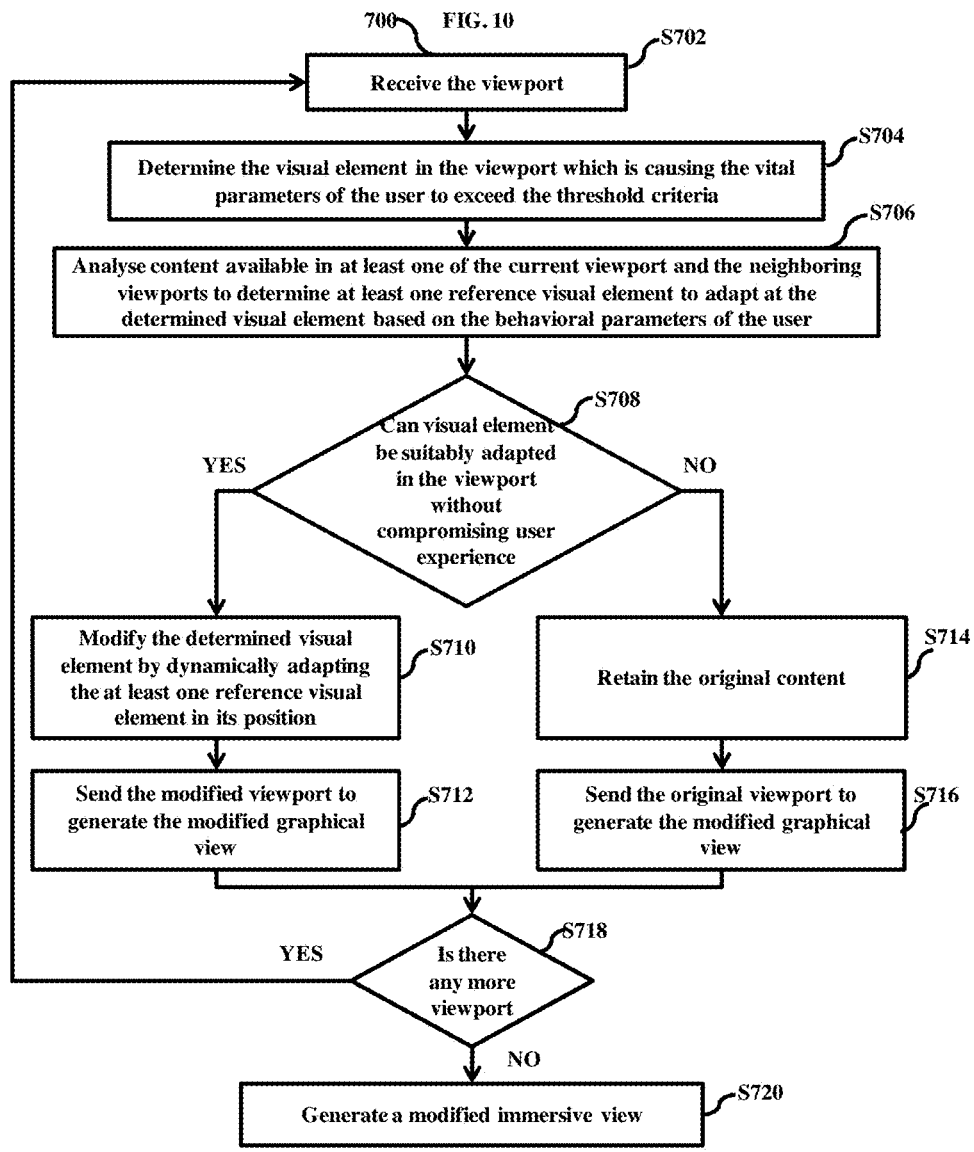

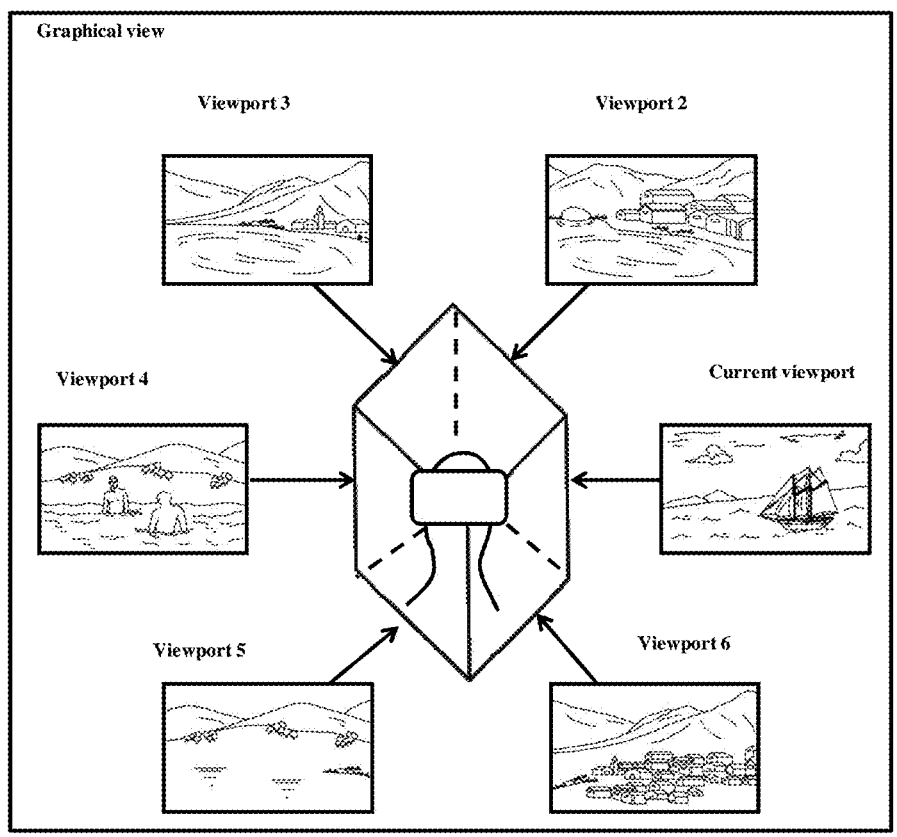

METHOD AND SYSTEM FOR ADAPTING CONTENT ON HMD BASED ON BEHAVIORAL PARAMETERS OF USER

CROSS-REFERENCE TO RELATED APPLICATIONS

This present application is based on, and claims priority from an Indian Application Number 201641022094 filed on 28 Jun. 2016 the disclosure of which is hereby incorporated by reference herein.

STATEMENT REGARDING FEDERALLY SPONSORED RESEARCH OR DEVELOPMENT

Not Applicable

STATEMENT REGARDING PRIOR DISCLOSURES BY THE INVENTOR OR A JOINT INVENTOR

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

FIELD OF INVENTION

The embodiments herein generally relate to Virtual Reality (VR) systems. More particularly related to a method and system for adapting content on a HMD based on behavioral parameters of a user.

BACKGROUND OF INVENTION

In general, Head-mounted display (HMD) devices are used to output VR contents in a 360 degree view. The VR contents are displayed in an immersive mode which provides enhanced depth effects making them appear more realistic thereof. Immersion into virtual reality is a perception of being physically present in a non-physical world. The perception is created by surrounding the user experiencing a virtual reality system in images, sound, or other stimuli that provide an engrossing total environment. Immersion enhances everyday experiences by making them more realistic, engaging, and satisfying.

Generally, the immersive experience leads to side effects like seizures, loss of awareness, eye strain, nausea, and motion sickness, usually caused due to depth sensed by the user. In conventional methods, before initiating an immersive session on the HMD device, a disclaimer or a warning is provided to the user indicating that the immersive content can cause nausea or discomfort to the user.

Consider a scenario in which the user is viewing the VR content, displayed on the HMD device. While viewing certain contents in the immersive mode, the user experiences variations in their vital parameters such as heart rate, pulse rate, blood pressure, etc. due to the contents being displayed on the HMD.

BRIEF SUMMARY OF THE INVENTION

An aspect of the invention provides a method for automatically adapting content on a Head Mounted Display (HMD) device. The method comprising receiving vital parameters of a user while the content displayed in a current viewport from a plurality of viewports in an immersive view on the HMD device; determining that the vital parameters of the user meet a first threshold criteria; determining at least one visual element of the content displayed in the current viewport that is causing the vital parameters to meet the first threshold criteria; detecting behavioral parameters of the user corresponding to the at least one determined visual element in the current viewport, wherein the behavioral parameters indicate at least one of user phobia of the at least one determined visual element, a disease of a user, a familiarity of the user with the at least one determined visual element, and a historic behavior of the user when the at least one determined visual element is viewed by the user; generating a modified immersive view by modifying the at least one determined visual element in the current viewport and at least one visual element in at least one neighboring viewport from the plurality of viewports of at least one subsequent frame of the content based on the behavioral parameters of the user; and causing to display the modified immersive view of the current view and the at least one neighboring viewport of the content on the HMD device.

The method further comprises monitoring the vital parameters of the user while viewing the modified immersive view of the content on the HMD device; determining that the vital parameters of the meets a second threshold criteria, wherein the second threshold criteria is dynamically defined based on the vital parameters and the behavioral parameters of the user; generating a non-immersive view of at least one subsequent frame of the content based on the behavioral parameters of the user; and displaying the non-immersive view of the at least one subsequent frame of the content on the HMD device.

In embodiment, generating the modified immersive view comprises determining the at least one neighboring viewport of the at least one subsequent frame of the content comprising the at least one determined visual element; determining at least one reference visual element corresponding to the at least one determined visual element to be modified based on the behavioral parameters; modifying the content displayed in the immersive view by dynamically adapting the at least one reference visual element at the at least one determined visual element in the current view and the at least one neighboring viewport of the at least one subsequent frame of the content; and generating the modified immersive view of the content comprising the at least one adapted reference visual element at the at least one determined visual element of the content in the current view and the at least one neighboring viewport of the at least one subsequent frame of the content.

In an embodiment, the at least one reference visual element is dynamically determined based on an analysis of the user behavior corresponding to the user historic behavior towards the at least one element available in at least one of the current viewport and the at least one neighboring viewport of the at least one subsequent frame of the content, a type of content available in at least one of the current viewport and the at least one neighboring viewport of the at least one subsequent frame of the content, other elements available in the available in at least one of the current viewport and the at least one neighboring viewport of the at least one subsequent frame of the content, user phobia associated with the at least one element, the type of content and the other elements available in at least one of the current viewport and the at least one neighboring viewport of the at least one subsequent frame of the content, familiarity of the user with the at least visual element and the other elements in at least one of the current viewport and the at least one neighboring viewport of the at least one subsequent frame of the content.

In an embodiment, the at least one reference visual element is dynamically adapted by masking the at least one determined visual element with the at least one reference visual element in the current viewport and the at least one neighboring viewport of the at least one subsequent frame of the content.

Another aspect of the invention provides a method for automatically adapting content on a Head Mounted Display (HMD) device. The method comprising receiving vital parameters of a user while displaying the content in a current viewport from a plurality of viewports in an immersive view on the HMD device; determining whether the vital parameters of the user meets a first threshold criteria and a second threshold criteria; and causing at least one of: generating a modified immersive view of the current viewport and at least one neighboring viewport of at least one subsequent frame of the content based on behavioral parameters of the user and displaying the modified immersive view of the current viewport and the at least one neighboring viewport of the at least one subsequent frame of the content on the HMD device when the vital parameters of the user meet the first threshold criteria and does not meet the second threshold criteria, and generating a non-immersive view of the current viewport and at least one neighboring viewport of at least one subsequent frame of the content based on behavioral parameters of the user and displaying the non-immersive view of the current viewport and the at least one neighboring viewport of the at least one subsequent frame of the content on the HMD device when the vital parameters of the user meet the first threshold criteria and the second threshold criteria.

In an embodiment, wherein the first threshold criteria is dynamically defined based on the vital parameters and the behavioral parameters of the user, and wherein the second threshold criteria is dynamically defined based on the vital parameters and the behavioral parameters of the user Yet another aspect of the invention provides a HMD device, for automatically adapting content, comprising a memory unit, a processor unit coupled to the memory unit and an immersive experience managing unit. The immersive experience managing unit configured for receiving vital parameters of a user while the content displayed in a current viewport from a plurality of viewports in an immersive view on the HMD device; determining that the vital parameters of the user meet a first threshold criteria; determining at least one visual element of the content displayed in the current viewport that is causing the vital parameters to meet the first threshold criteria; detecting behavioral parameters of the user corresponding to the at least one determined visual element in the current viewport, wherein the behavioral parameters indicate at least one of user phobia of the at least one determined visual element, a disease of a user, a familiarity of the user with the at least one determined visual element, and a historic behavior of the user when the at least one determined visual element is viewed by the user; generating a modified immersive view by modifying the at least one determined visual element in the current viewport and at least one visual element in at least one neighboring viewport from the plurality of viewports of at least one subsequent frame of the content based on the behavioral parameters of the user; and causing to display the modified immersive view of the current view and the at least one neighboring viewport of the content on the HMD device.

Further, the immersive experience managing unit configured for monitoring the vital parameters of the user while viewing the modified immersive view of the content on the HMD device; determining that the vital parameters of the meets a second threshold criteria, wherein the second threshold criteria is dynamically defined based on the vital parameters and the behavioral parameters of the user; generating a non-immersive view of at least one subsequent frame of the content based on the behavioral parameters of the user; and displaying the non-immersive view of the at least one subsequent frame of the content on the HMD device.

Yet another aspect of the invention provides a HMD device, for automatically adapting content, comprising a memory unit, a processor unit coupled to the memory unit and an immersive experience managing unit. The immersive experience managing unit configured for receiving vital parameters of a user while displaying the content in a current viewport from a plurality of viewports in an immersive view on the HMD device; determining whether the vital parameters of the user meets a first threshold criteria and a second threshold criteria; and causing at least one of: generating a modified immersive view of the current viewport and at least one neighboring viewport of at least one subsequent frame of the content based on behavioral parameters of the user and displaying the modified immersive view of the current viewport and the at least one neighboring viewport of the at least one subsequent frame of the content on the HMD device when the vital parameters of the user meet the first threshold criteria and does not meet the second threshold criteria, and generating a non-immersive view of the current viewport and at least one neighboring viewport of at least one subsequent frame of the content based on behavioral parameters of the user and displaying the non-immersive view of the current viewport and the at least one neighboring viewport of the at least one subsequent frame of the content on the HMD device when the vital parameters of the user meet the first threshold criteria and the second threshold criteria.

Yet another aspect of the invention provides for automatically adapting content. The system comprises a HMD device displaying an immersive view of the content, at least one sensor configured to measure vital parameters of a user while viewing the content displayed in a current viewport from a plurality of viewports in the immersive view on the HMD device; and a mobile device. The mobile device is configured for receiving vital parameters of a user while the content displayed in a current viewport from a plurality of viewports in an immersive view on the HMD device; determining that the vital parameters of the user meet a first threshold criteria; determining at least one visual element of the content displayed in the current viewport that is causing the vital parameters to meet the first threshold criteria; detecting behavioral parameters of the user corresponding to the at least one determined visual element in the current viewport, wherein the behavioral parameters indicate at least one of user phobia of the at least one determined visual element, a disease of a user, a familiarity of the user with the at least one determined visual element, and a historic behavior of the user when the at least one determined visual element is viewed by the user; generating a modified immersive view by modifying the at least one determined visual element in the current viewport and at least one visual element in at least one neighboring viewport from the plurality of viewports of at least one subsequent frame of the content based on the behavioral parameters of the user; and causing to display the modified immersive view of the current view and the at least one neighboring viewport of the content on the HMD device.

Further, the mobile device is configured for monitoring the vital parameters of the user while viewing the modified immersive view of the content on the HMD device; determining that the vital parameters of the meets a second threshold criteria, wherein the second threshold criteria is dynamically defined based on the vital parameters and the behavioral parameters of the user; generating a non-immersive view of at least one subsequent frame of the content based on the behavioral parameters of the user; and displaying the non-immersive view of the at least one subsequent frame of the content on the HMD device.

Yet another aspect of the invention provides for automatically adapting content. The system comprises a HMD device displaying an immersive view of the content, at least one sensor configured to measure vital parameters of a user while viewing the content displayed in a current viewport from a plurality of viewports in the immersive view on the HMD device; and a mobile device. The mobile device is configured for receiving vital parameters of a user while displaying the content in a current viewport from a plurality of viewports in an immersive view on the HMD device; determining whether the vital parameters of the user meets a first threshold criteria and a second threshold criteria; and causing at least one of: generating a modified immersive view of the current viewport and at least one neighboring viewport of at least one subsequent frame of the content based on behavioral parameters of the user and displaying the modified immersive view of the current viewport and the at least one neighboring viewport of the at least one subsequent frame of the content on the HMD device when the vital parameters of the user meet the first threshold criteria and does not meet the second threshold criteria, and generating a non-immersive view of the current viewport and at least one neighboring viewport of at least one subsequent frame of the content based on behavioral parameters of the user and displaying the non-immersive view of the current viewport and the at least one neighboring viewport of the at least one subsequent frame of the content on the HMD device when the vital parameters of the user meet the first threshold criteria and the second threshold criteria.

BRIEF DESCRIPTION OF THE FIGURES

The embodiments herein will be better understood from the following detailed description with reference to the drawings, in which:

FIG. 6 is a flow chart illustrating a method for automatically adapting content on the HMD device based on the vital parameters of the user, according to an embodiment as disclosed herein;

FIG. 7 is a flow chart illustrating various operations performed by the HMD device for generating a modified immersive view, according to an embodiment as disclosed herein;

FIG. 9 illustrates an example scenario in which the VR contents in the current graphical view are modified, and similar contents available in the subsequent frames are also modified, based on the behavioral parameters of the user, according to an embodiment as disclosed herein;

FIG. 10 is a flow chart illustrating an example process for analyzing a type of content in at least one of a current viewport and neighboring viewports for determining at least one reference visual element, according to an embodiment as disclosed herein;

FIG. 11A illustrates an example graphical view in which the vital parameters of the user meet the threshold criteria when the presence of water is identified in the current viewport is, according to an embodiment as disclosed herein;

DETAILED DESCRIPTION OF INVENTION

Figure 1:
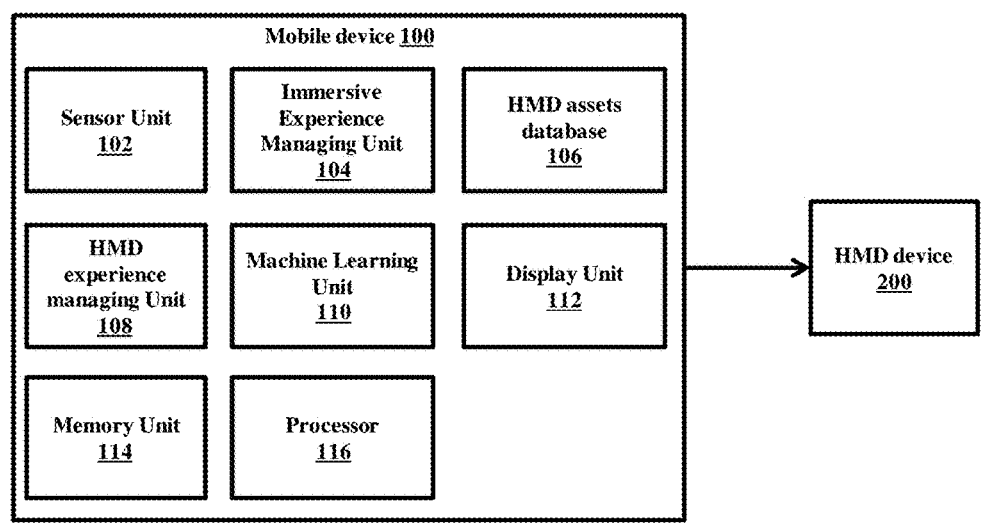
FIG. 1 illustrates a system for automatically adapting content on a HMD device using a mobile device, according to an embodiment as disclosed herein.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly the embodiments herein provide a method for automatically adapting content on a HMD device based on vital parameters of a user. The method includes receiving the vital parameters of the user while viewing an immersive view of the content on the HMD device. Further, the method includes determining that the vital parameters meet a threshold criteria. Further, the method includes generating a modified immersive view of the content based on behavioral parameters of the user. Further, the method includes displaying the modified immersive view on the HMD device.

Unlike conventional systems and method, the immersive view of the content is modified for automatically adapting the modified content on the HMD device. Generally, VR content or a video is made up of multiple micro-experiences and these micro-experiences refer to portions of videos. Stitching (or combining) several micro-experiences create a complete video. In an embodiment, adapting content, non-exclusively, refers to seamlessly masking, swapping or replacing the micro-experience with other micro-experience in the video. In another embodiment, adapting content, nonexclusively, refers to seamlessly skipping or deleting, skipping, muting or regulating the micro-experience in the video.

In the conventional methods and systems, a set of videos which are developed internally by medical practitioners are stored in the HMD device. The user is provided with an option for selecting the videos from that set. Further, it is to be noted that the conventional methods are related to curing certain medical conditions like insomnia or schizophrenia. Unlike conventional systems and methods, the proposed invention focuses on providing an improved VR experience for the user watching videos in real-time (more particularly, live videos) without compromising on health factors. The state machine decides the state in which the content should be displayed on the HMD based on the behavioral parameters of the user.

Unlike conventional methods and systems which use the vital parameters of the user to cure certain medical conditions like insomnia by playing specifically designed videos in immersive mode, the proposed invention uses the vital parameters of the user to identify the current health state of the user. Based on the health state of the user, the system seamlessly adapt the contents to provide a modified immersive view of the content while maintaining the vital parameters of the user within the threshold. The content to be adapted is efficiently determined based on the user behavioral parameters.

Referring now to the drawings, and more particularly to FIGS. 1 through 12, where similar reference characters denote corresponding features consistently throughout the figures, there are shown preferred embodiments.

FIG. 1 is a system for automatically adapting content on a HMD device 200 using a mobile device 100, according to an embodiment as disclosed herein. In an embodiment, the system includes the mobile device 100 and the HMD device 200. The mobile device 100 can be, for example, a mobile phone, a smart phone, Personal Digital Assistants (PDAs), a tablet, a wearable device, or the like. In an embodiment, the mobile device 100 includes a sensor unit 102, an Immersive experience managing unit 104, a HMD assets database 106, a HMD experience managing unit 108, a machine learning unit 110, a display unit 112, a memory unit 114, and a processor 116.

Initially, the sensor unit 102 monitors vital parameters of a user while viewing the immersive view of the content on the HMD device 200. In an example, the vital parameters of the user can be one or more of electroencephalogram (EEG), electrocardiogram (EKG), Blood Pressure (BP), eye blink rate, heart rate, pulse rate, breathing rate, frequency of eyelid closing, head movement away from an action area during an immersive session, or the like. Further, the vital parameters are received by the immersive experience managing unit 104. The Immersive experience managing unit 104 can be configured to determine whether the received vital parameters are within a threshold criteria. In an example, the threshold criteria consist of two threshold levels for any parameter. Further, the immersive experience managing unit 104 can be configured to determine whether the received vital parameter of the user exceeds a first threshold level. If the received vital parameter exceeds the first threshold level then, the Immersive experience managing unit 104 can be configured to determine whether the received vital parameters are within a second threshold level. If the vital parameters are within the second threshold level then, the Immersive experience managing unit 104 can be configured to identify at least one visual element displayed on at least one of the viewports, which is causing the first threshold level to be crossed. It then dynamically generates a modified view of the identified visual element displayed on that particular viewport using a reference visual element from the HMD assets database 106, based on the behavioral parameters of the user.

The HMD experience managing unit 108 then sends the modified view of the immersive content to the HMD device 200 to be displayed to the user. The mobile device 100 continues to receive the vital parameters of the user. The immersive experience managing unit 104 generates a modified view of the content every time the vital parameters of the user crosses the first threshold and is within the second threshold, by one of the techniques of masking, overlaying, or replacing the original immersive content displayed on at least one of the viewports without breaking a sandbox of an application displaying the content on the HMD device 200.

If the immersive experience managing unit 104 detects that the received vital parameters of the user has crossed both the threshold levels, it switches to the non-immersive mode. The immersive experience managing unit 104 then sends the non-immersive view of the immersive content to the HMD device 200 to be displayed to the user. The mobile device 100 continues to receive the vital parameters of the user, which is monitored to detect if it meets the threshold criteria. On determining that the vital parameters meet the threshold criteria, the proposed method is repeated as described above. The Immersive experience managing unit 104 shares the received vital parameters of the user with a Machine Learning Unit 110.

In an embodiment, the Machine Learning Unit 110 performs machine learning in parallel. The machine learning comprises storing data relating to the vital parameters of the user, the behavioural parameters of the user, the threshold criteria for the user, modifications made to the immersive content being displayed etc. The Machine Learning Unit 110 uses this data to dynamically set the threshold criteria. The display unit 112 displays the vital parameters of the user on the mobile device 100.

The memory unit 114 can include one or more computer-readable storage media. The memory unit 114 can include non-volatile storage elements. Examples of such non-volatile storage elements can include magnetic hard discs, optical discs, floppy discs, flash memories, or forms of electrically programmable memories (EPROM) or electrically erasable and programmable (EEPROM) memories. In addition, the memory unit 114 can, in some examples, be considered a non-transitory storage medium. The term "non-transitory" can indicate that the storage medium is not embodied in a carrier wave or a propagated signal. However, the term "non-transitory" should not be interpreted that the memory unit 114 is non-movable. In some examples, the memory unit 114 can be configured to store larger amounts of information than the memory. In certain examples, a non-transitory storage medium can store data that can, over time, change (e.g., in Random Access Memory (RAM) or cache). The processor unit 116 can be configured to interact with the units in the mobile device 100 to perform the functionalities of the corresponding units.

In an example, consider a scenario where the received vital parameter of the user is their heart rate which is around 130 beats per min. Let the normal range of heart rate be 60 to 100 beats per min. Also, let the threshold criteria be 180>VP>120 where the first threshold value is 120 bpm and the second threshold value is 180 bpm. The immersive experience managing unit 104 detects that the received parameter has crossed the first threshold value but is within the second threshold value. It then determines the visual element in the current viewport which is leading to the crossing of the first threshold value of the vital parameters of the user. The Immersive experience managing unit 104 then modifies it with a reference visual element from the HMD assets database 106. It also shares the vital parameters of the user with the Machine Learning Unit 110 which stores it for future reference and to dynamically set the threshold values.

Consider another scenario where the received vital parameter of the user is their heart rate which is around 190 beats per min. Let the normal range of heart rate be 60 to 100 beats per min. Also, let the threshold criteria be 180>VP>120 where the first threshold value is 120 bpm and the second threshold value is 180 bpm. The immersive experience managing unit 104 detects that the received parameter (i.e., the heart rate) has crossed both the first and the second threshold levels. It then directs the HMD experience managing unit 108 to generate the non-immersive mode of the immersive content being displayed. The HMD experience managing unit 108 then displays the non-immersive view of the content on the HMD device 200 to bring the vital parameters of the user within the normal range and thereby not to compromise on user experience. The immersive experience managing unit 104 also shares the vital parameters of the user with the Machine Learning Unit 110 which stores it for future reference and to dynamically set the threshold values.

The FIG. 1 shows exemplary system but it is to be understood that other embodiments are not limited thereon. In other embodiments, the system can include less or more number of mobile devices and HMD devices. Further, the labels or names of the units in the mobile device are used only for illustrative purpose and does not limit the scope of the invention. One or more units can be combined to perform same or substantially similar function in the system.

Figure 2:
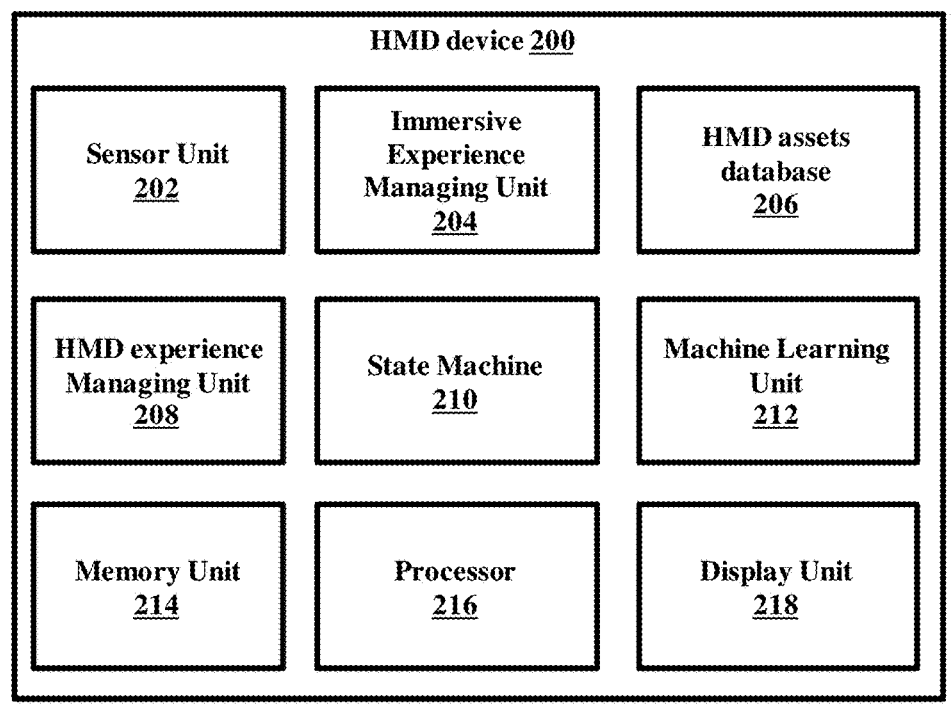
FIG. 2 is a block diagram of the HMD device, according to an embodiment as disclosed herein.

FIG. 2 illustrates a block diagram of the HMD device 200 for automatically adapting the content, according to an embodiment as disclosed herein. In an embodiment, the HMD device 200 comprises of a sensor unit 202, an Immersive experience managing unit 204, an HMD experience managing unit 206, an HMD assets database 208, a state machine 210, a machine learning unit 212, a memory unit 214, a processor unit 216, and a display unit 218. In another embodiment, the system for adapting the content on the HMD device 200 can be implemented directly on the HMD device 200 without the use of the mobile device 100, as shown in the FIG. 2.

In an embodiment, the immersive Experience Managing Unit 204 identifies visual element in the current viewport which is causing the vital parameters of the user to cross the first threshold level but not the second threshold level. Further, the immersive experience managing unit 204 determines the neighbouring ports containing similar contents and then modifies the determined visual element with a reference visual element from the HMD assets database 206 and communicates it to the HMD experience managing unit 208. The state machine 210 facilitates the seamless transition from immersive view to modified-immersive view on the HMD device 200. Here, the immersive view of the contents is the first state and the modified-immersive view of the contents displayed on the HMD device 200 is the second state of the state machine.

In an embodiment, the immersive experience managing unit 204 identifies the visual element in the current viewport which is causing the vital parameters of the user to cross both the first threshold and the second threshold values. It then generates a non-immersive view of the content to be displayed on the HMD device 200. The state machine 210 facilitates seamless transition from the immersive view to the non-immersive view on the HMD device 200. Here, the immersive view of the contents is the first state and the non-immersive view of the contents displayed on the HMD device 200 is the second state of the state machine 210. In an embodiment herein, the state machine 210 is defined to have a finite number of states with each state corresponding to a set of allowed operations. Further, the state machine 210 is employed to cause transition among the states in response to external events, such as the vital parameters of the user meeting the threshold criteria.

In an embodiment, the Machine Learning Unit 212 performs the machine learning in parallel. In an example, the machine learning comprises storing data relating to the vital parameters of the user, the behavioural parameters of the user, the threshold criteria for every user, modifications made to the immersive content being displayed, etc. Further, the Machine Learning Unit 212 uses this data to dynamically set the threshold criteria.

The memory unit 214 can include one or more computer-readable storage media. The memory unit 214 can include non-volatile storage elements. Examples of such non-volatile storage elements can include magnetic hard discs, optical discs, floppy discs, flash memories, or forms of electrically programmable memories (EPROM) or electrically erasable and programmable (EEPROM) memories. In addition, the memory unit 214 can, in some examples, be considered a non-transitory storage medium. The term "non-transitory" can indicate that the storage medium is not embodied in a carrier wave or a propagated signal. However, the term "non-transitory" should not be interpreted that the memory unit 214 is non-movable. In some examples, the memory unit 214 can be configured to store larger amounts of information than the memory. In certain examples, a non-transitory storage medium can store data that can, over time, change (e.g., in Random Access Memory (RAM) or cache). The processor unit 216 can be configured to interact with the units in the HMD device 200 to perform the functionalities of the corresponding units. The display unit 218 displays the modified immersive view on the HMD device 200 to the user. Further, the display unit 218 display the non-immersive view on the HMD device 200 to the user.

The FIG. 2 shows the HMD device 200 but it is to be understood that other embodiments are not limited thereon. In other embodiments, the HMD device 200 can include less or more number of units. Further, the labels or names of the units are used only for illustrative purpose and does not limit the scope of the invention. One or more units can be combined to perform same or substantially similar function in the HMD device 200.

Figure 3:
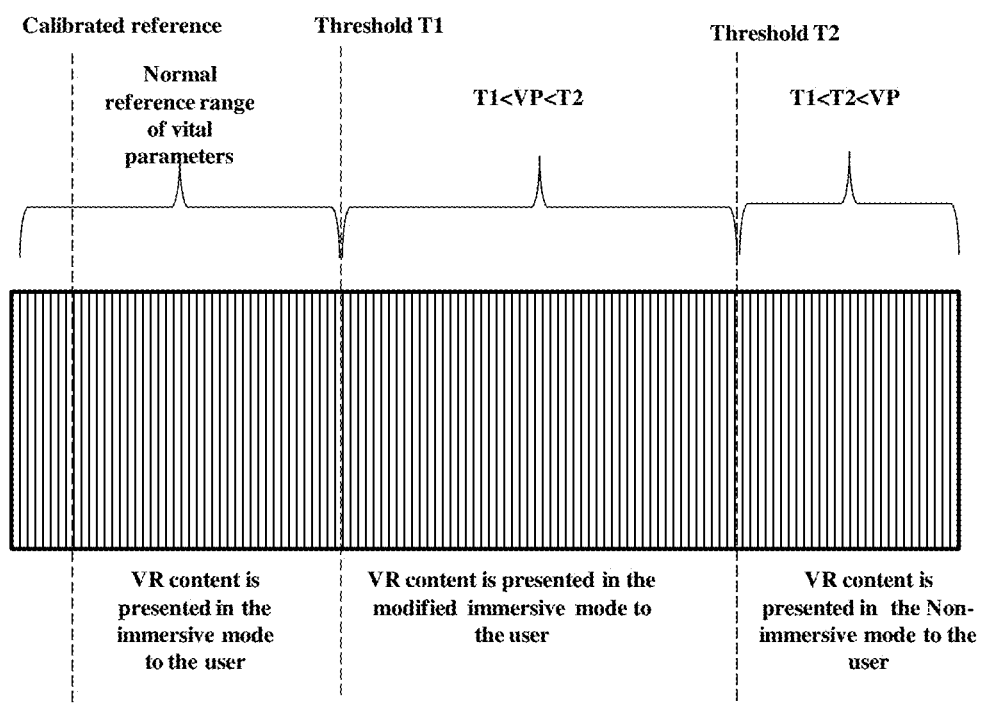
FIG. 3 illustrates continuous monitoring of vital parameters of a user during a VR session, according to an embodiment as disclosed herein.

FIG. 3 illustrates continuous monitoring of vital parameters of a user during an immersive session, according to an embodiment as disclosed herein.

The vital parameters of the user are monitored continuously during the VR session. As long as the vital parameters of the user do not meet the threshold criteria the VR contents are displayed in the immersive mode. If the vital parameters of the user exceed the first threshold value (T1) but are below the second threshold value (T2), then the VR contents are dynamically modified before presenting it on the HMD device 200 at real time. If the vital parameters of the user exceed both the first threshold value and the second threshold value, it is an indication of severe health condition deterioration of the user due to the contents being displayed. Hence, the VR contents are presented in the non-immersive mode on the HMD device 200 in order not to compromise on user's health at the same time provide enhanced user experience.

Figure 4:
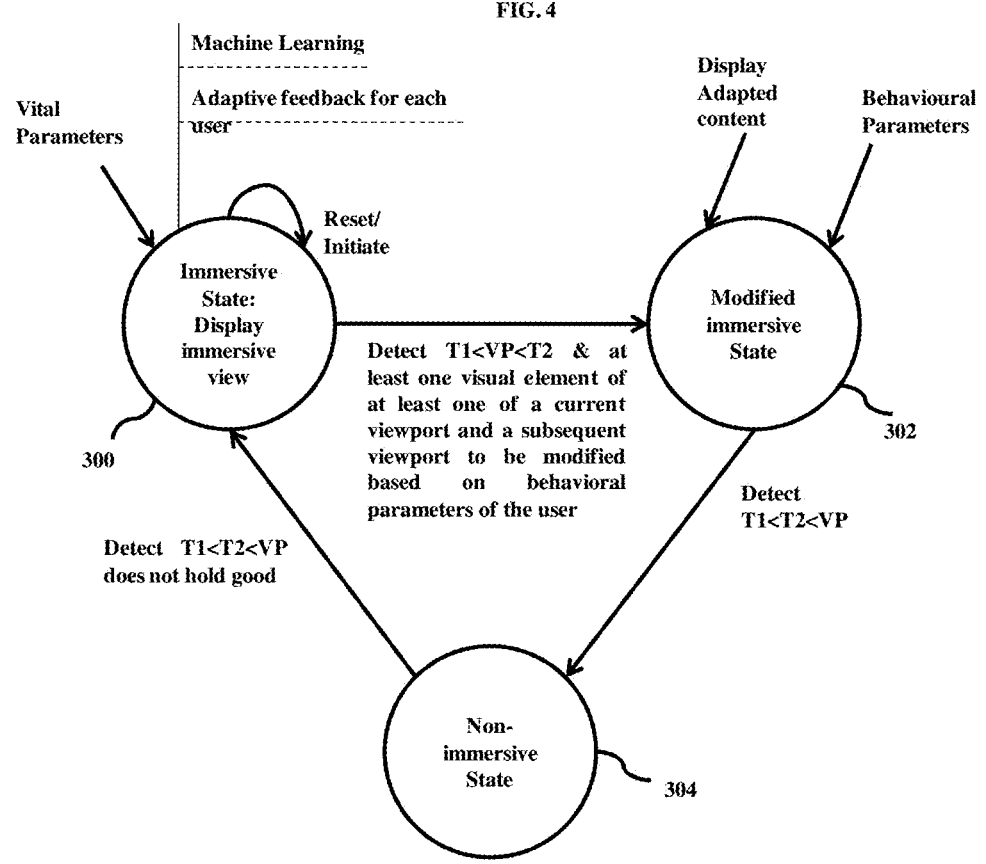
FIG. 4 illustrates a state machine diagram of the HMD device indicating various states attained by the HMD device during VR session, according to an embodiment as disclosed herein.

FIG. 4 illustrates a state machine diagram of the HMD device 200 indicating various states attained by the HMD during the VR session, according to an embodiment as disclosed herein.

The state machine diagram is used to select one of the three states in which the VR content need to be displayed on the HMD device 200. The state machine diagram depicts the three states in which the contents are displayed during the VR session. Initially, when the session is initiated, the contents displayed on the multiple viewports of the HMD device 200 are in the immersive state 300 where the user feels just as immersed as they usually feel in the real environment. The immersive experience managing unit 104/204 then receives the vital parameters of the user during the ongoing HMD session and determines if it meets the threshold criteria. The threshold criteria comprise two thresholds values. If the received vital parameters of the user exceeds the first threshold value (T1) and are within the second threshold value (T2), then the immersive experience managing unit 104/204 identifies the at least one visual element of at least one of the current viewport and the neighboring viewports to be modified based on the behavioral parameters of the user. The modified content is displayed on the respective viewports of the HMD device 200 in the modified immersive state 302. If the received vital parameters of the user exceed both the thresholds, then the HMD device 200 switches from the immersive state 300 to the non-immersive state 304 without compromising the health condition of the user.

In an embodiment, the adaptive feedback mechanism is carried out for all the users. For a repeat user, the user history and threshold criteria are retrieved and the state of the HMD device 200 is selected based on the machine learning carried out by the machine learning unit 110/212. The machine learning also ensures the threshold criteria are dynamically defined.

In an embodiment, a graphical view is a projection model used to present a video stream as if it were a real image surrounding the viewer. The graphical view can be projected as a sphere, a cube, a frustum, or the like. The graphical view is projected in the form of multiple viewports wherein the video considered is displayed on these multiple viewports in parts, presenting a complete 360 degree view. In an example, the graphical view can be projected as a cube. Here the sides of the cube can be considered as viewports displaying the video in parts, thereby presenting the complete 360 degree view to the viewer when they turn their head in different directions. In a 2D video, multiple video frames are stitched together to form a complete video. In case of a 2D video the current graphical view is the current video frame displayed to the user on the HMD.

Figure 5:
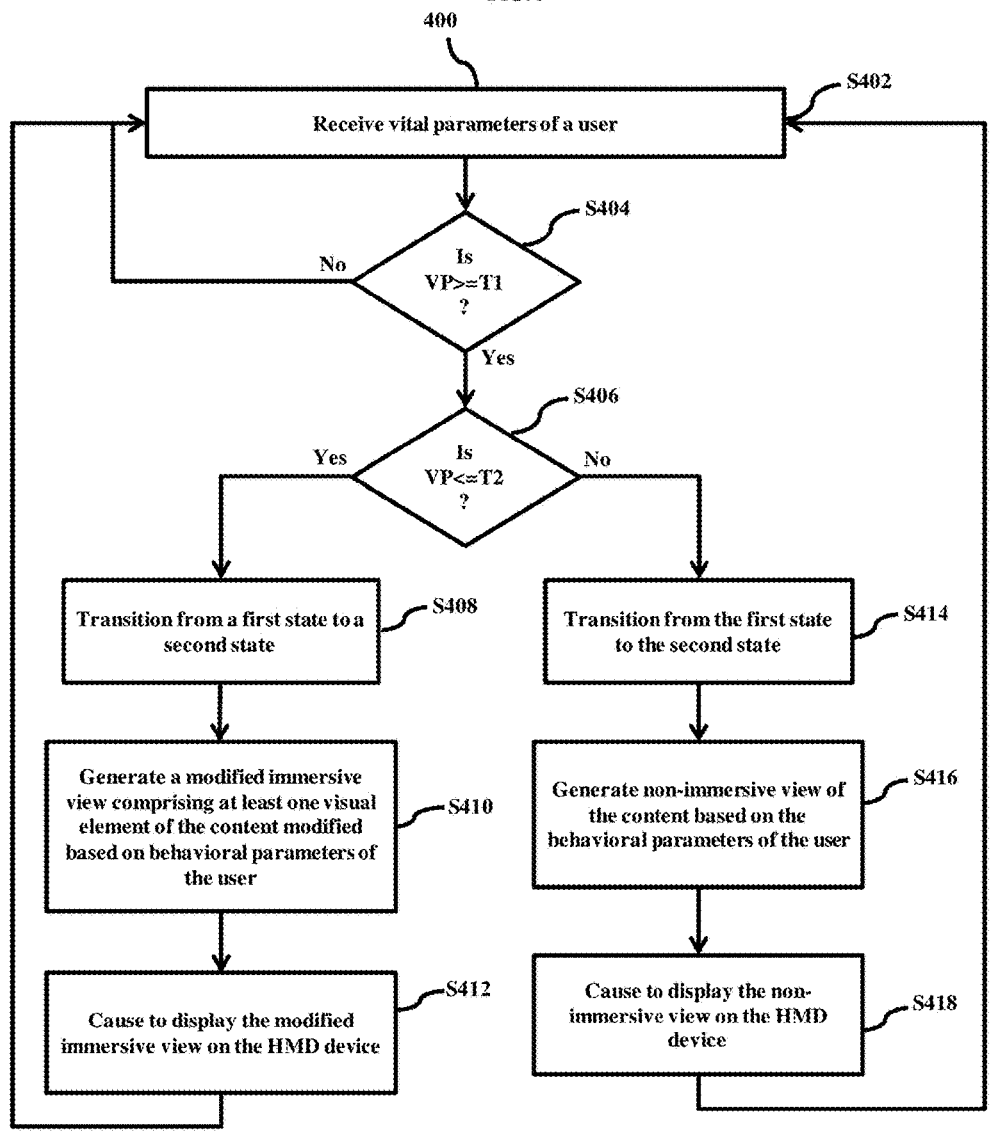
FIG. 5 is a flowchart illustrating a method for automatically adapting content on the HMD device based on vital parameters of the user, using the mobile device to change the states of the HMD device, according to an embodiment as disclosed herein.

FIG. 5 is a flow chart 400 illustrating a method for automatically adapting the content on the HMD device 200 based on the vital parameters of the user, using the mobile device 100 to change the states of the HMD device 200, according to an embodiment as disclosed herein.

At S402, the method includes receiving the vital parameters of the user. The method allows the immersive experience managing unit 104 to receive the vital parameters of the user. At S404, if it is determined that the vital parameters (VP) of the user do not exceed (i.e., less than) the first threshold (T1) value then, the method is looped to S402. At S404, if it is determined that the vital parameters of the user exceed the first threshold value (T1) then, at S406, the method includes determining whether the vital parameters are within the second threshold value (T2). At S406, if it is determined that the vital parameters of the user are within the second threshold value (T2) (i.e., less than or equal to) then, at S408, the method includes seamlessly transitioning from the first state to the second state. The method allows the HMD device 200 to transition from the first state to the second state.

At S410, the method includes generating the modified immersive view including the at least one visual element of the content modified based on the behavioral parameters of the user. The method allows the immersive experience managing unit 104 to generate the modified immersive view including the at least one visual element of the content modified based on the behavioral parameters of the user. At S412, the method includes causing to display the modified immersive view on the HMD device 200. The method allows the HMD experience managing unit 108 to cause to display the modified immersive view on the HMD device 200.

At S406, if it is determined that the vital parameters of the user exceeds the second threshold value (i.e., greater than or equal to) then, at S414, the method includes seamlessly transitioning from the first state to the second state. The method allows the HMD device 200 to transition from the first state to the second state. At S416, the method includes generating the non-immersive view of the content based on the behavioral parameters of the user. The method allows the immersive experience managing unit 104 to generate the non-immersive view of the content based on the behavioral parameters of the user. At S418, the method allows the HMD experience managing unit 108 to cause to display the non-immersive view on the HMD device 200.

The various actions, acts, blocks, steps, or the like in the flow chart 400 can be performed in the order presented, in a different order or simultaneously. Further, in some embodiments, some of the actions, acts, blocks, steps, or the like can be omitted, added, modified, skipped, or the like without departing from the scope of the invention.

FIG. 6 is a flow chart 500 illustrating a method for automatically adapting content on the HMD device 200 based on the vital parameters of the user, according to an embodiment as disclosed herein.

At S502, the method includes receiving the vital parameters of the user. The method allows the immersive experience managing unit 204 to receive the vital parameters of the user. At S504, if it is determined that the vital parameters of the user does not exceed (i.e., less than) the first threshold value then (T1), the method is looped to S502. At S504, if it is determined that the vital parameters of the user exceeds the first threshold value then, at S506, the method includes determining whether the vital parameters are within the second threshold value (T2). At S506, if it is determined that the vital parameters of the user are within the second threshold value (T2) (i.e., less than equal to) then, at S508, the method includes generating the modified immersive view including the at least one visual element of the content modified based on the behavioral parameters of the user. The method allows the immersive experience managing unit 204 to generate the modified immersive view including the at least one visual element of the content modified based on the behavioral parameters of the user. At S510, the method includes causing to display the modified immersive view on the HMD device 200. The method allows the HMD experience managing unit 208 to cause to display the modified immersive view on the HMD device 200.

At S506, if it is determined that the vital parameters of the user exceeds the second threshold value (T2) (i.e., greater than equal to) then, at S512, the method includes generating the non-immersive view of the content based on the behavioral parameters of the user. The method allows the immersive experience managing unit 204 to generate the non-immersive view of the content based on the behavioral parameters of the user. At S514, the method includes causing to display the non-immersive view on the HMD device 200. The method allows the HMD experience managing unit 208 to cause to display the non-immersive view on the HMD device 200.

The various actions, acts, blocks, steps, or the like in the flow chart 500 can be performed in the order presented, in a different order or simultaneously. Further, in some embodiments, some of the actions, acts, blocks, steps, or the like can be omitted, added, modified, skipped, or the like without departing from the scope of the invention.

FIG. 7 is a flow chart 600 illustrating various operations performed by the HMD device 200 for generating the modified immersive view, according to an embodiment as disclosed herein. At step S602, the method includes detecting the behavioural parameters of the user. In an embodiment, the method allows the sensor unit 102 to detect the behavioral parameters of the user. In another embodiment, the method allows the sensor unit 202 to detect the behavioral parameters of the user.

At S604, the method includes determining the at least one visual element of at least one of a current viewport and a neighboring viewport of the immersive view to be modified based on the behavioral parameters. In an embodiment, the method allows the Immersive experience managing unit 104 to determine the at least one visual element of at least one of the current viewport and the neighboring viewport of the immersive view to be modified based on the behavioral parameters. In another embodiment, the method allows the Immersive experience managing unit 204 to determine the at least one visual element of at least one of the current viewport and the neighboring viewport of the immersive view to be modified based on the behavioral parameters.

At S606, the method includes modifying the content in the immersive view by dynamically adapting the at least one reference visual element at the at least one determined visual element based on one of the techniques of masking, overlaying, or replacing. In an embodiment, the method allows the Immersive experience managing unit 104 to modify the content in the immersive view by dynamically adapting the at least one reference visual element at the at least one determined visual element based on one of the techniques of masking, overlaying, or replacing. In another embodiment, the method allows the Immersive experience managing unit 204 to modify the content in the immersive view by dynamically adapting the at least one reference visual element at the at least one determined visual element based on one of the techniques of masking, overlaying, or replacing.

At S608, the method includes generating the modified immersive view comprising the at least one reference visual elements of the content. In an embodiment, the method allows the HMD experience managing unit 108 to generate the modified immersive view comprising the at least one reference visual elements of the content. In another embodiment, the method allows the HMD experience managing unit 208 to generate the modified immersive view comprising the at least one reference visual elements of the content. In an embodiment, the immersive content displayed to the user on the HMD device 200 which is causing the vital parameters of the user to meet the threshold criteria can be modified by masking the determined visual element. The method of masking involves hiding a determined visual element by creating a mask on it. This technique completely hides the determined visual element using a reference visual element from the HMD assets database 106/206 so that the user will not be able to view the content in the current as well the neighboring viewports. In an example, consider a scenario where the user is watching a horror video having a scary character displayed in the immersive mode. The vital parameters of the user meet the threshold criteria. The immersive experience manager 104/204 on determining that the vital parameters of the user has met the threshold criteria, masks the scary character in the entire video to provide seamless immersive experience to the user without compromising on the health condition of the user.

In an embodiment, the immersive content which is causing the vital parameters of the user to meet the threshold criteria on being displayed on the HMD device 200 can be modified by the method of overlaying. The method involves overlaying of a reference visual element as a layer on a determined visual element. The overlaying is performed against a substantially transparent background such that the user is able to view the determined visual element partially. The reference visual element to be overlaid is available in the HMD assets database 106/206.

In an embodiment, the immersive content displayed to the user on the HMD device 200 which is causing the vital parameters of the user to meet the threshold criteria can be modified by replacing the determined visual element. The method involves identifying the content which is causing the vital parameters of the user to meet the threshold criteria and replacing it with some other content that is less immersive and pleasing to the user. In an example, consider a scenario where the user watches a video having fire displayed in the immersive mode. The vital parameters of the user meet the threshold criteria. The immersive experience manager 104/204 on determining this replaces the fire content with sand in the video provide seamless immersive experience to the user without compromising on their health.

The various actions, acts, blocks, steps, or the like in the flow chart 600 can be performed in the order presented, in a different order or simultaneously. Further, in some embodiments, some of the actions, acts, blocks, steps, or the like can be omitted, added, modified, skipped, or the like without departing from the scope of the invention.

Figure 8A:
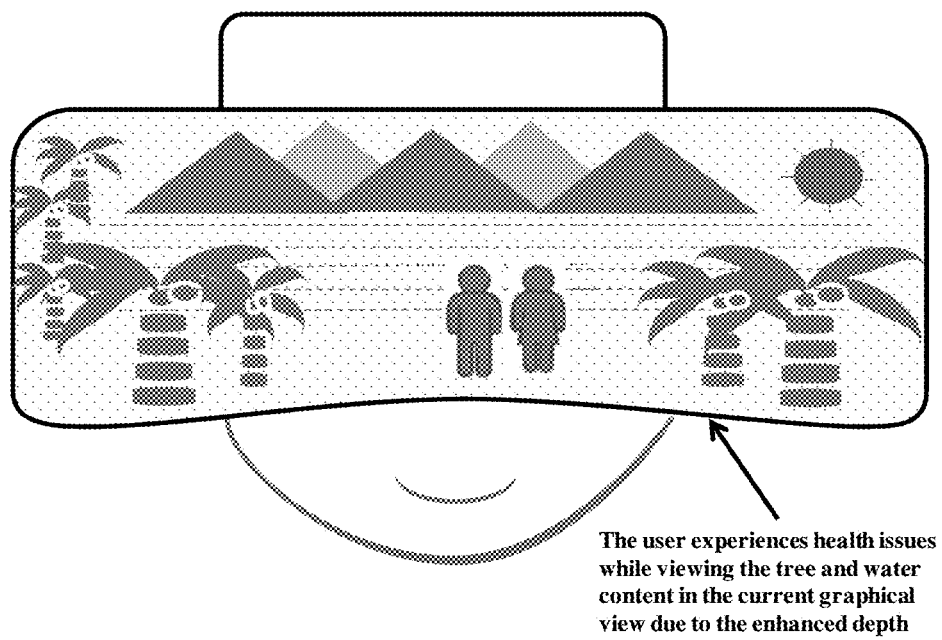
FIG. 8A illustrates an example scenario in which a VR content in presented to the user in an immersive mode on the HMD device, according to an embodiment as disclosed herein.

FIG. 8A illustrates an example scenario in which a VR content is presented to the user in an immersive mode on the HMD device, according to an embodiment as disclosed herein.

Figure 8B:
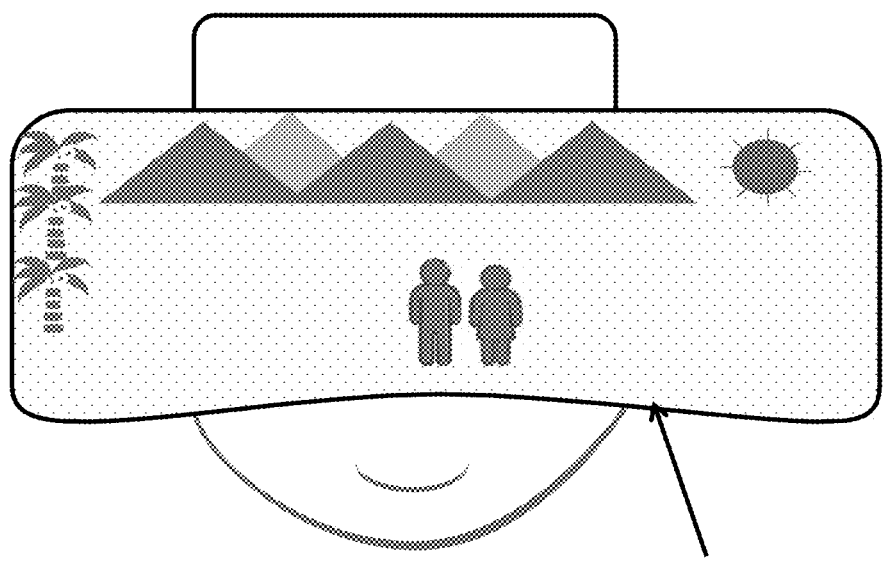
FIG. 8B illustrates an example scenario in which the VR content is presented to the user after adaptation in the immersive mode on the HMD device, according to an embodiment as disclosed herein.

FIG. 8B illustrates an example scenario in which the VR content is presented to the user after adaptation in the immersive mode on the HMD device, according to an embodiment as disclosed herein.

Figure 8C:
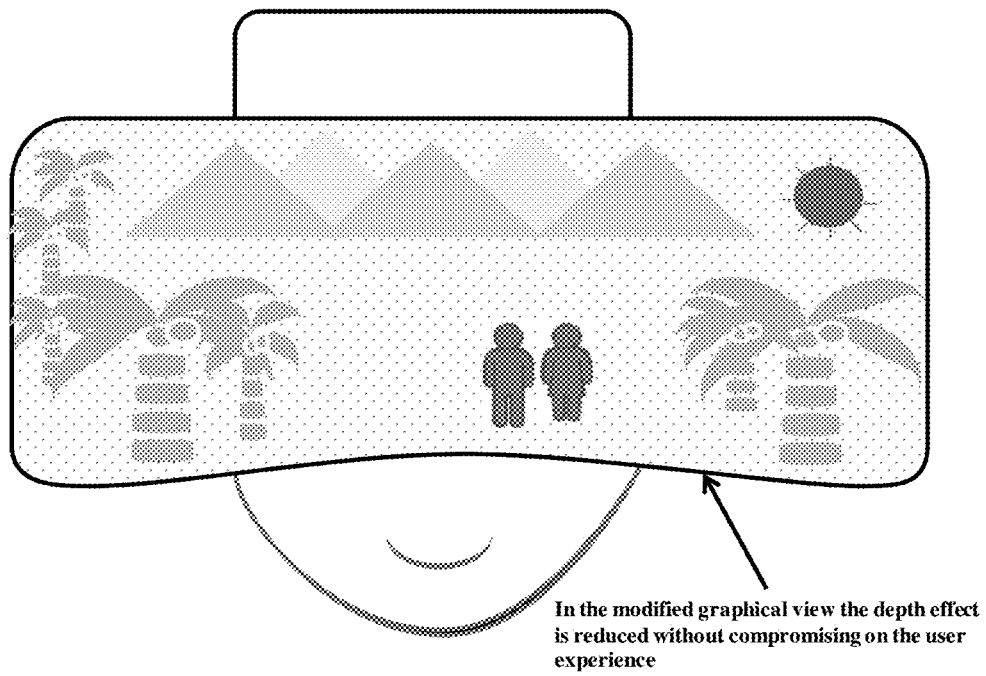
FIG. 8C illustrates an example scenario in which the VR content is presented to the user on the HMD device in a non-immersive mode, according to an embodiment as disclosed herein.

FIG. 8C illustrates an example scenario in which the VR content is presented to the user on the HMD device in a non-immersive mode, according to an embodiment as disclosed herein.

FIG. 8A depicts the current graphical view of the VR content presented to the user in the immersive mode on their HMD device 200, while the vital parameters and the behavioural parameters of the user are continuously monitored. The user experiences health issues while viewing the video. Here the determined visual element which is causing the vital parameters of the user to meet the threshold criteria are the tree and the water content in the current graphical view due to the enhanced depth effects. On detecting that the vital parameters of the user exceeds the first threshold value and is within the second threshold value, the video is adapted. In FIG. 8B, the modified graphical view is illustrated where the tree and water content which led to the threshold criteria being met is modified using a reference visual element based on the behavioural parameters of the user. Here, the reference visual element used is the sand present in the graphical view which is used to mask the determined visual element of the tree and the water content. On detecting that the vital parameters of the user exceeds both the first threshold value and the second threshold value, the depth effect is reduced and the video is provided (i.e., presented) in the non-immersive mode, as shown in the FIG. 8C.

FIG. 9 illustrates an example scenario in which the VR contents in the current graphical view are modified, and similar contents available in the subsequent frames are also modified, based on the behavioral parameters of the user, according to an embodiment as disclosed herein. In an embodiment, the current and neighbouring frames of the video are displayed in the FIG. 9. Multiple frames stitched together make a complete video. The immersive experience managing unit 104/204 identifies the content in the current frame which is causing the threshold levels to be crossed. In this case, the image of water displayed in the current frame is causing the threshold levels to be crossed. The immersive experience managing unit 104/204 proactively identifies similar contents available in the subsequent frames. It then proactively modifies the current frame and the subsequent frames displaying water content in it using techniques like masking, overlaying, or replacing to continue the immersive session seamlessly. Further, FIG. 9 also displays the original video frames containing water displayed on it and the modified video graphical view where the water content is replaced with sand to provide better user experience.

FIG. 10 is a flow chart 700 illustrating an example process for analysing the type of content in at least one of the current viewport and the neighbouring viewports for determining at least one reference visual element, according to an embodiment as disclosed herein. At S702, the immersive experience managing unit 104/204 receives the viewport whose content need to be analyzed. At S704, it identifies the visual element in the received viewport which causes the vital parameters of the user to exceed the threshold criteria. At S706, the immersive experience managing unit 104/204 analyses the content available in the current viewport and the neighboring viewports and determines at least one reference visual element which is used to modify the identified visual element causing the vital parameters to meet the threshold criteria, based on the behavioral parameters of the user. At S708, the immersive experience managing unit 104/204 checks if the identified visual element can be suitably adapted in the viewport without compromising the user experience. If it finds that adaption can be done seamlessly, then at S710 the immersive experience managing unit 104/204 modifies the determined visual element by dynamically adapting the at least one reference visual element in its position. Further, at S712, the immersive experience managing unit 104/204 sends the modified viewport to the HMD experience managing unit 108/208 to generate the modified graphical view.

At S708, if the immersive experience managing unit 104/204 finds that adaption cannot be done seamlessly, and then at S714 it retains the original content. Further, at S716, the immersive experience managing unit 104/204 sends the original viewport to the HMD experience managing unit 108/208 to generate the modified graphical view. At S718, the immersive experience managing unit 104/204 checks if there are any more viewports to be analyzed. If there are subsequent viewports to be analyzed, then the process is looped to S702, if there are no more viewports to be analyzed, then the HMD experience managing unit 108/208 generates the modified immersive view at S720 by stitching together all the received viewports.

In an example, consider a scenario wherein the 360 degree video displayed on the multiple viewports of the HMD has water depicted in all the viewports. At S704, on analysis it is found that the water content is causing the vital parameters of the user to meet the threshold criteria. But some of the neighbouring viewports depicts people playing in the water, which is a familiar and pleasant scene to the user. Hence, at S708 the water content in all the viewports is not changed and the original content is retained.

In another example, consider a scenario wherein the 360 degree video displayed on the multiple viewports of the HMD depicts people playing in the water on all the viewports, which is a familiar and pleasant scene to the user. Hence, at S708 the water content in all the viewports need not be changed and the original content is retained.

The various actions, acts, blocks, steps, or the like in the flow chart 700 can be performed in the order presented, in a different order or simultaneously. Further, in some embodiments, some of the actions, acts, blocks, steps, or the like can be omitted, added, modified, skipped, or the like without departing from the scope of the invention.

Figure 11B:
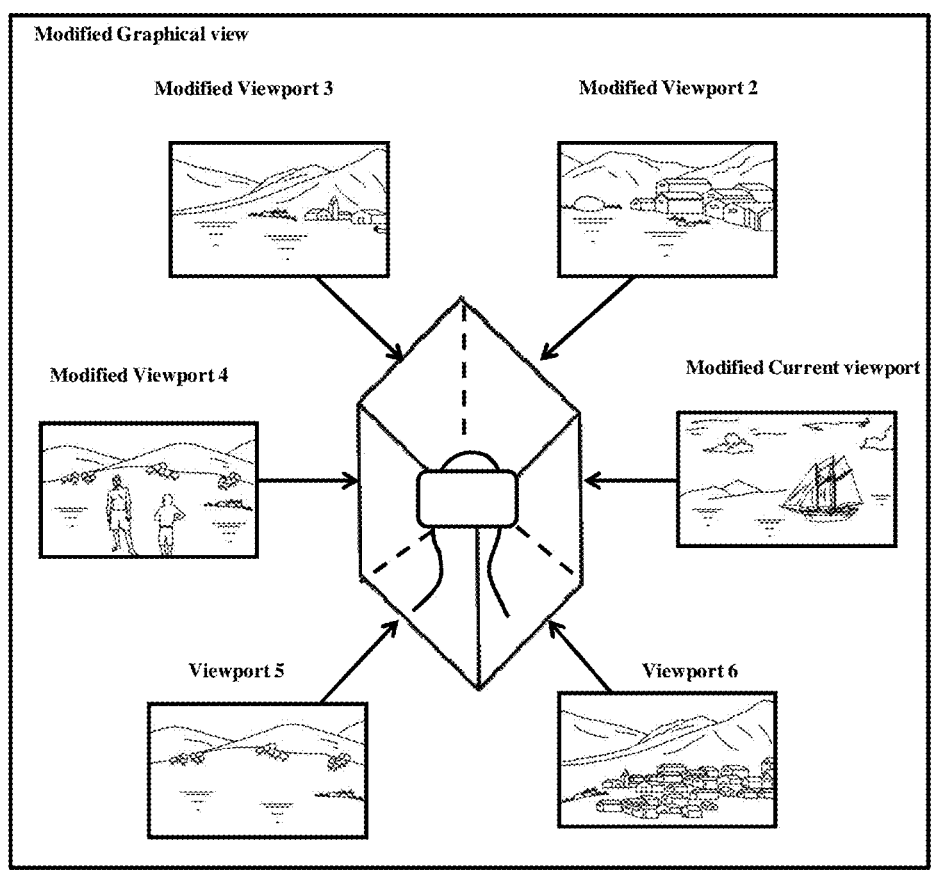
FIG. 11B illustrates an example modified graphical view in which the presence of water displayed in the current viewport and neighbouring viewports is modified based on the vital parameters of the user, according to an embodiment as disclosed herein.
Figure 11C:
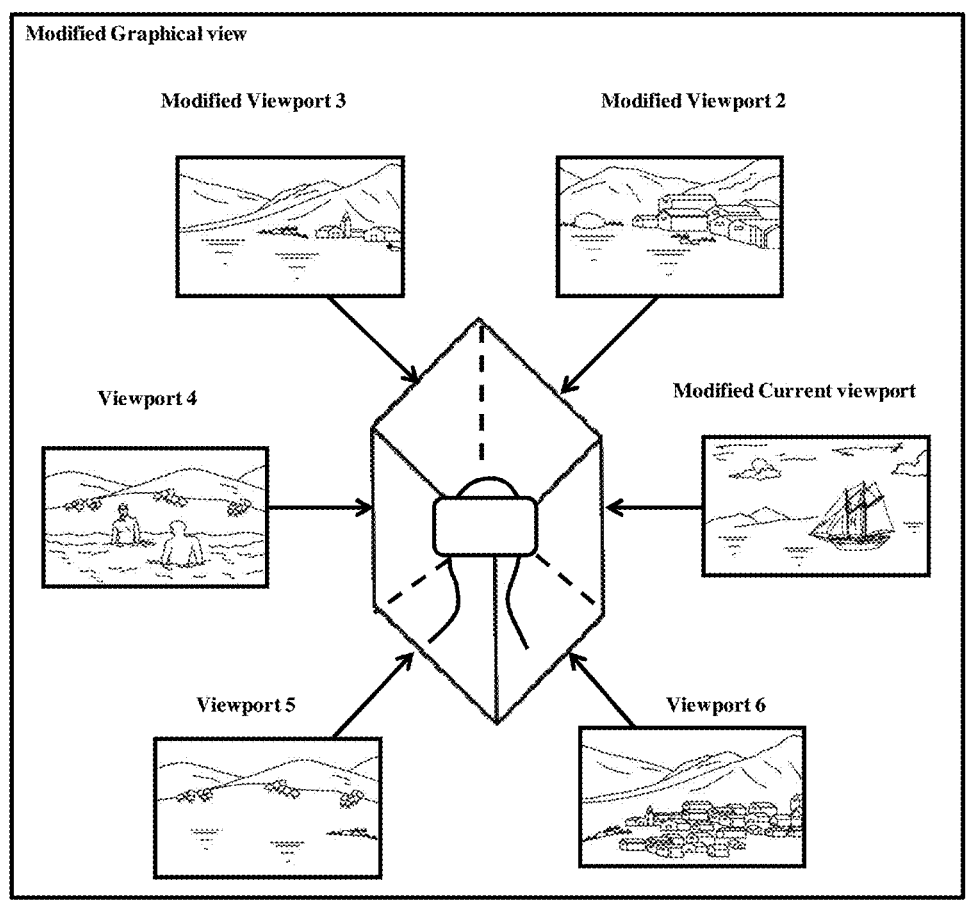
FIG. 11C illustrates another example modified graphical view in which the presence of water displayed in the current viewport and neighbouring viewports is modified based on the type of content and the vital parameters of the user, according to an embodiment as disclosed herein.

FIG. 11A illustrates an example graphical view in which the vital parameters of the user meet the threshold criteria when the presence of water is identified in the current viewport is, according to an embodiment as disclosed herein;

FIG. 11B illustrates an example modified graphical view in which the presence of water displayed in the current viewport and neighbouring viewports is modified based on the vital parameters of the user, according to an embodiment as disclosed herein;

FIG. 11C illustrates another example modified graphical view in which the presence of water displayed in the current viewport and neighbouring viewports is modified based on the type of content and the vital parameters of the user, according to an embodiment as disclosed herein. The FIG. 11A is an example illustration of the 360 degree graphical view of the content displayed on different viewports of the HMD device 200. The current viewport is displaying an immersive view of the content which includes depiction of water in it. The immersive experience managing unit 104/204 which receives the vital parameters of the user viewing the content on the HMD device 200 determines that the vital parameters are meeting the threshold criteria. It then identifies that the presence of water in the content displayed in the current viewport is causing the vital parameters of the user to meet the threshold criteria. It also identifies similar content in the neighbouring viewports. Accordingly, the immersive experience managing unit 104/204 dynamically replaces the water content in all the neighbouring viewports with sand to reduce the depth effect being experienced by based on the behavioural parameters of the user, as shown in the FIG. 11B. The replacement is performed seamlessly without disturbing the ongoing session on the HMD device 200, so that the user experience is not compromised. The adaption of the content will eventually bring the vital parameters of the user within the threshold criteria, thereby ensuring that the user continues viewing the session with enhanced user experience.

In an embodiment, the dynamic adaption of the contents can be performed intelligently taking into consideration the user history from the machine learning unit 110/212. As shown in the FIG. 11C, viewport 4 displays humans playing in the water, where the water content is not adapted with sand as performed in the other viewports i.e., current viewport, viewport 2 and viewport 3. Here, the user's history is taken into consideration from the machine learning unit 110/212. Intelligently some scenes are not modified due to the user's familiarity with the objects being displayed. For example, viewport 4 displays the humans playing in the water. As the user is familiar with the humans, they are calm due to the presence of humans and feels that the depth is not very much. Hence, the viewport 4 is not modified in the FIG. 11C.

Although the above example scenarios illustrate the method and system of the use cases of the invention, but are not limited to the same. Many modifications and variations will be apparent to those of ordinary skill in the art without departing from the scope and spirit of the described embodiments. The below examples further describe the invention without being illustrated.

In an example, consider that the behavioral parameters of a user indicate that the user is suffering from heart diseases, and generally the heart beat gets increased when a sudden event is detected. In such a scenario, assume that the user is watching a horror video in an immersive mode on a HMD. While watching the horror video, the HMD determines that vital parameters of the user indicate that the current heart beat rate of the user is 126 bpm which exceeds the heart beat rate criteria. In response to determining that the current heart beat rate of the user exceeds the heart beat rate criteria, the HMD determines some upcoming scenes of the horror video includes some sudden events such as sudden appearances of a monster or shriek of various characters. In such scenario, as the current heart beat rate of the user exceeds the heart beat rate criteria, the HMD device determines a reference visual element to be dynamically adapted in the upcoming scenes of the horror video. The HMD device determines based on the user behavior the reference visual elements that can be suitably adapted in the upcoming scenes of the horror video without comprising on the user health while improving/maintaining the virtual experience of the user as follows:

Case 1: If the behavioral parameters of the user indicates that the user heart beat rate gets increased when a sudden visual event is detected, then the HMD can skip the visual elements where the sudden appearances of a monster is articulated in the scene.

Case 2: If the behavioral parameters of the user indicates that the user heart beat rate gets increased when a sudden event is detected along with some voice effect, then the HMD can mute the background voice when sudden appearances of a monster is displayed on the screen of the HMD.

Case 3: If the behavioral parameters of the user indicates that the user heart beat rate gets increased when a sudden monster is detected along with some voice effect, then the HMD can mask the monster with some suitable human character in the scene.

Case 4: If the behavioral parameters of the user indicate that the user get restless when they hear some loud or weird sound, then the HMD can replace the shrieks in the upcoming scenes with some pleasant sound suitable in such environment. The pleasant sound is dynamically determined based on the content being available in the scene at that instance of time.

In the conventional methods and systems, the user vital parameters are measured and the video or scene itself is changed. This may decrease the immersive experience of the user. Moreover, the user may either stop watching the video in immersive mode using the HMD or may undergo some health problems if the user continues to watch the same video. Unlike the conventional systems and methods, the proposed invention determines the user heath parameters and dynamically determines the reference visual elements which can be suitably adapted based on the user behavior. The determined reference visual elements are seamlessly adapted in the video which leads to continue maintaining or improving the immersive user experience while maintaining the vital parameters of the user. The user can continue enjoying the video without compromising on heath factors.

In an example, consider that the behavioral parameters of the user indicate that the user is suffering from aqua phobia.

And generally, the user experiences a persistent and abnormal fear on seeing a large stretch of water. In such a scenario, assume that the user is watching a movie in an immersive mode on a HMD. While watching the video, the HMD determines that vital parameters of the user indicate that the current heart beat rate of the user is 150 bpm which exceeds the first threshold value of the heart beat rate criteria. In response to determining that the current heart beat rate of the user exceeds the heart beat rate criteria, the HMD determines that some upcoming scenes of the video includes a large stretch of black water. In such a scenario, as the current heart beat rate of the user exceeds the heart beat rate criteria, the HMD device determines a reference visual element based on user behavior, to be dynamically adapted in the upcoming scenes of the video. If the behavioral parameters of the user indicate that the user heart beat rate gets increased when a large stretch of black water is detected, then the HMD can replace the large stretch of black water with green grass in the current scene as well as the upcoming scenes.

Figure 12:
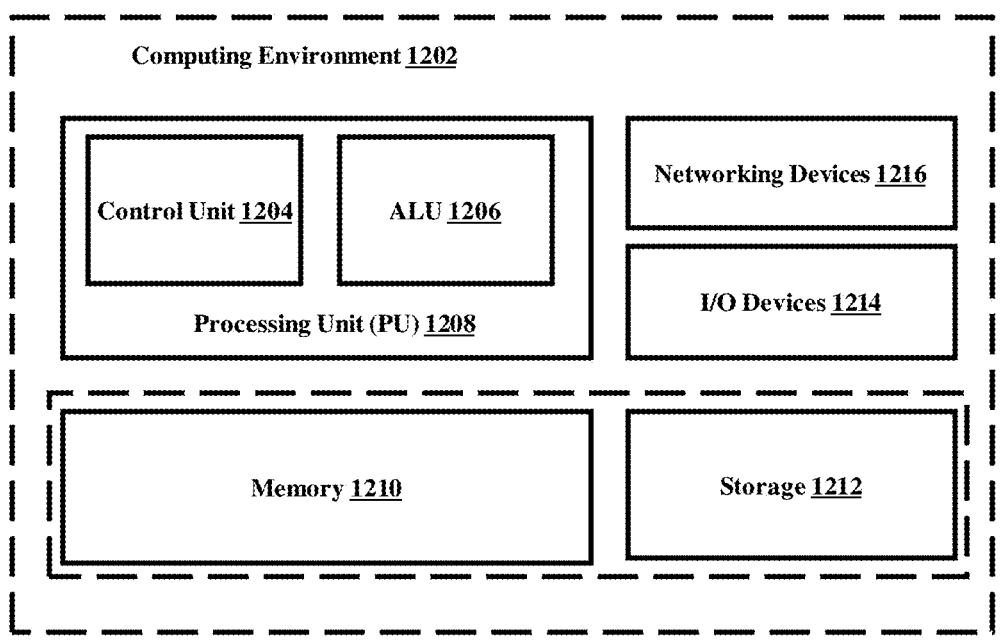
FIG. 12 illustrates a computing environment implementing a method and system for adapting the content on the HMD device based on the behavioral parameters of the user, according to an embodiment as disclosed herein.

FIG. 12 illustrates a computing environment 1202 implementing a method and system for adapting content on the HMD device 200, according to an embodiment as disclosed herein. As depicted in the figure, the computing environment 1202 comprises at least one processor 1208 that is equipped with a control unit 1204 and an Arithmetic Logic Unit (ALU) 1206, a memory 1210, a storage unit 1212, plurality of networking devices 1216 and a plurality Input output (I/O) devices 1214. The processor 1208 is responsible for processing the instructions of the technique. The processor 1208 receives commands from the control unit to perform its processing. Further, any logical and arithmetic operations involved in the execution of the instructions are computed with the help of the ALU 1206.

The overall computing environment 1202 can be composed of multiple homogeneous and/or heterogeneous cores, multiple CPUs of different kinds, special media and other accelerators. The processor 1208 is responsible for processing the instructions of the technique. Further, the plurality of processors 1208 can be located on a single chip or over multiple chips.

The technique comprising of instructions and codes required for the implementation are stored in either the memory unit 1210 or the storage 1212 or both. At the time of execution, the instructions can be fetched from the corresponding memory 1210 or storage 1212, and executed by the processor 1208.

In case of any hardware implementations various networking devices 1216 or external I/O devices 1214 can be connected to the computing environment to support the implementation through the networking unit and the I/O device unit.

The embodiments disclosed herein can be implemented through at least one software program running on at least one hardware device and performing network management functions to control the elements. The elements shown in the FIGS. 1 through 12 include blocks which can be at least one of a hardware device, or a combination of hardware device and software module.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for automatically adapting content on a Head Mounted Display (HMD) device, the method comprising:

receiving vital parameters of a user while the content displayed in a current viewport from a plurality of viewports in an immersive view on the HMD device;

determining that the vital parameters of the user meet a first threshold criteria;

determining at least one visual element of the content displayed in the current viewport that is causing the vital parameters to meet the first threshold criteria;

detecting behavioral parameters of the user corresponding to the at least one determined visual element in the current viewport, wherein the behavioral parameters indicate at least one of user phobia of the at least one determined visual element, a disease of a user, a familiarity of the user with the at least one determined visual element, and a historic behavior of the user when the at least one determined visual element is viewed by the user;

generating a modified immersive view by modifying the at least one determined visual element in the current viewport and at least one visual element in at least one neighboring viewport from the plurality of viewports of at least one subsequent frame of the content based on the behavioral parameters of the user; and causing to display the modified immersive view of the current view and the at least one neighboring viewport of the content on the HMD device.

2. The method of claim 1, wherein generating the modified immersive view by modifying the at least one determined visual element in the current view and the at least one determined visual element in the at least one neighboring viewport of the at least one subsequent frame of the content based on the behavioral parameters of the user comprising:

determining the at least one neighboring viewport of the at least one subsequent frame of the content comprising the at least one determined visual element;

determining at least one reference visual element corresponding to the at least one determined visual element to be modified based on the behavioral parameters;

modifying the content displayed in the immersive view by dynamically adapting the at least one reference visual element at the at least one determined visual element in the current view and the at least one neighboring viewport of the at least one subsequent frame of the content; and generating the modified immersive view of the content comprising the at least one adapted reference visual element at the at least one determined visual element of the content in the current view and the at least one neighboring viewport of the at least one subsequent frame of the content.

3. The method of claim 2, wherein the at least one reference visual element is dynamically determined based on an analysis of the user behavior corresponding to the user historic behavior towards the at least one element available in at least one of the current viewport and the at least one neighboring viewport of the at least one subsequent frame of the content, a type of content available in at least one of the current viewport and the at least one neighboring viewport of the at least one subsequent frame of the content, other elements available in the available in at least one of the current viewport and the at least one neighboring viewport of the at least one subsequent frame of the content, user phobia associated with the at least one element, the type of content and the other elements available in at least one of the current viewport and the at least one neighboring viewport of the at least one subsequent frame of the content, familiarity of the user with the at least visual element and the other elements in at least one of the current viewport and the at least one neighboring viewport of the at least one subsequent frame of the content.

4. The method of claim 2, wherein the at least one reference visual element is dynamically adapted by masking the at least one determined visual element with the at least one reference visual element in the current viewport and the at least one neighboring viewport of the at least one subsequent frame of the content.

5. The method of claim 4, wherein the at least one determined visual element is masked with the at least one reference visual element without breaking a sandbox of an application displaying the content on the HMD device.

6. The method of claim 2, wherein the at least one reference visual element is dynamically adapted by overlaying the at least one determined visual element on the at least one reference visual element in the current viewport and the at least one neighboring viewport of the at least one subsequent frame of the content.

7. The method of claim 6, wherein the at least one reference visual element is overlaid on the at least one determined visual element without breaking a sandbox of an application displaying the content on the HMD device.

8. The method of claim 2, wherein the at least one reference visual element is dynamically adapted by replacing the at least one determined visual element with the at least one reference visual element in the current viewport and the at least one neighboring viewport of the at least one subsequent frame of the content.

9. The method of claim 8, wherein the at least one determined visual element is replaced with the at least one reference visual element without breaking a sandbox of an application displaying the content on the HMD device.

10. The method of claim 1, wherein the first threshold criteria is dynamically defined based on the vital parameters and the behavioral parameters of the user.

11. The method of claim 1, further comprises:
monitoring the vital parameters of the user while viewing the modified immersive view of the content on the HMD device;
determining that the vital parameters of the meets a second threshold criteria, wherein the second threshold criteria is dynamically defined based on the vital parameters and the behavioral parameters of the user;
generating a non-immersive view of at least one subsequent frame of the content based on the behavioral parameters of the user; and
displaying the non-immersive view of the at least one subsequent frame of the content on the HMD device.

12. The method of claim 1, wherein the HMD device transition from a first state to a second state to display the modified immersive view of the current view and the at least one neighboring viewport of the content based on a state machine.

13. The method of claim 12, wherein the first state is an immersive state and the second state is a modified-immersive state.

14. The method of claim 12, wherein the state machine identifies a type of graphical element of the content to be displayed on the HMD device and communicates the type of graphical element to facilitate configuration of one of the immersive view and the modified-immersive view on the HMD device.

15. A method for automatically adapting content on a Head Mounted Display (HMD) device, the method comprising:
receiving vital parameters of a user while displaying the content in a current viewport from a plurality of viewports in an immersive view on the HMD device;
determining whether the vital parameters of the user meets a first threshold criteria and a second threshold criteria; and
causing at least one of:
generating a modified immersive view of the current viewport and at least one neighboring viewport of at least one subsequent frame of the content based on behavioral parameters of the user and displaying the modified immersive view of the current viewport and the at least one neighboring viewport of the at least one subsequent frame of the content on the HMD device when the vital parameters of the user meet the first threshold criteria and does not meet the second threshold criteria, and
generating a non-immersive view of the current viewport and at least one neighboring viewport of at least one subsequent frame of the content based on behavioral parameters of the user and displaying the non-immersive view of the current viewport and the at least one neighboring viewport of the at least one subsequent frame of the content on the HMD device when the vital parameters of the user meet the first threshold criteria and the second threshold criteria.

16. The method of claim 15, wherein the first threshold criteria is dynamically defined based on the vital parameters and the behavioral parameters of the user, and wherein the second threshold criteria is dynamically defined based on the vital parameters and the behavioral parameters of the user.

17. The method of claim 15, wherein generating the modified immersive view of the current viewport and the at least one neighboring viewport of the at least one subsequent frame of the content based on the behavioral parameters comprises:
identifying at least one visual element of the content displayed in the current viewport that is causing the vital parameters to exceed the first threshold criteria;
detecting the behavioral parameters of the user corresponding to the at least one determined visual element in the current viewport, wherein the behavioral parameters indicate at least one of user phobia of the at least one determined visual element, a disease of a user, a familiarity of the user with the at least one determined visual element, and a historic behavior of the user when the at least one determined visual element is viewed by the user;
determining the at least one neighboring viewport of the at least one subsequent frame of the content comprising the at least one determined visual element;
determining at least one reference visual element corresponding to the at least one determined visual element to be modified based on the behavioral parameters;
modifying the content displayed in the immersive view by dynamically adapting the at least one reference visual element at the at least one determined visual element in the current view and the at least one neighboring viewport of the at least one subsequent frame of the content; and generating the modified immersive view comprising the at least one reference visual elements at the at least one determined visual element of the content in the current viewport and the at least one neighboring viewport of the at least one subsequent frame of the content.

18. The method of claim 15, wherein the at least one reference visual element is dynamically determined based on an analysis of the user behavior corresponding to the users historic behavior towards the at least one element available in at least one of the current viewport and the at least one neighboring viewport of the at least one subsequent frame of the content, a type of content available in at least one of the current viewport and the at least one neighboring viewport of the at least one subsequent frame of the content, other elements available in the available in at least one of the current viewport and the at least one neighboring viewport of the at least one subsequent frame of the content, user phobia associated with the at least one element, the type of content and the other elements available in at least one of the current viewport and the at least one neighboring viewport of the at least one subsequent frame of the content, familiarity of the user with the at least visual element and the other elements in at least one of the current viewport and the at least one neighboring viewport of the at least one subsequent frame of the content.

19. The method of claim 15, wherein a state machine identifies a type of graphical element of the content to be displayed on the HMD device and communicate the type of graphical elements to facilitate configuration of one of the immersive view and the non-immersive view on the HMD device.

20. A Head Mounted Display (HMD) device for automatically adapting content, comprising:
 a memory unit;
 a processor unit, coupled to the memory unit; and
 an immersive experience managing unit, configured to
  receive vital parameters of a user while viewing the content displayed in a current viewport from a plurality of viewports in an immersive view on the HMD device;
  determine that the vital parameters of the user meet a first threshold criteria;
  identify at least one visual element of the content displayed in the current viewport that is causing the vital parameters to meet the first threshold criteria;
  detect behavioral parameters of the user corresponding to the at least one determined visual element in the current viewport, wherein the behavioral parameters indicate at least one of user phobia of the at least one determined visual element, a disease of a user, a familiarity of the user with the at least one determined visual element, and a historic behavior of the user when the at least one determined visual element is viewed by the user;
  generate a modified immersive view by modifying the at least one determined visual element in the current viewport and at least one visual element in at least one neighboring viewport from the plurality of viewports of at least one subsequent frame of the content based on the behavioral parameters of the user; and
  cause to display the modified immersive view of the current view and the at least one neighboring viewport of the content on the HMD device.

21. The HMD of claim 20, wherein generate the modified immersive view by modifying the at least one determined visual element in the current view and the at least one determined visual element in the at least one neighboring viewport of the at least one subsequent frame of the content based on the behavioral parameters of the user comprising:
 determine the at least one neighboring viewport of the at least one subsequent frame of the content comprising the at least one determined visual element;
 determine at least one reference visual element corresponding to the at least one determined visual element to be modified based on the behavioral parameters;
 modify the content displayed in the immersive view by dynamically adapting at least one reference visual element at the at least one visual element in the current view and the at least one neighboring viewport of the at least one subsequent frame of the content; and
 generate the modified immersive view of the content comprising the at least one adapted reference visual element at the at least one determined visual element of the content in the current view and the at least one neighboring viewport of the at least one subsequent frame of the content.

22. The HMD of claim 21, wherein the at least one reference visual element is dynamically determined based on an analysis of the user behavior corresponding to the user historic behavior towards the at least one element available in at least one of the current viewport and the at least one neighboring viewport of the at least one subsequent frame of the content, a type of content available in at least one of the current viewport and the at least one neighboring viewport of the at least one subsequent frame of the content, other elements available in the available in at least one of the current viewport and the at least one neighboring viewport of the at least one subsequent frame of the content, user phobia associated with the at least one element, the type of content and the other elements available in at least one of the current viewport and the at least one neighboring viewport of the at least one subsequent frame of the content, familiarity of the user with the at least visual element and the other elements in at least one of the current viewport and the at least one neighboring viewport of the at least one subsequent frame of the content.

23. The HMD of claim 21, wherein the at least one reference visual element is dynamically adapted by masking the at least one determined visual element with the at least one reference visual element in the current viewport and the at least one neighboring viewport of the at least one subsequent frame of the content.

24. The HMD of claim 23, wherein the at least one determined visual element is masked with the at least one reference visual element without breaking a sandbox of an application displaying the content on the HMD device.

25. The HMD of claim 21, wherein the at least one reference visual element is dynamically adapted by overlaying the at least one determined visual element on the at least one reference visual element.

26. The HMD of claim 25, wherein the at least one reference visual element is overlaid on the at least one determined visual element without breaking a sandbox of an application displaying the content on the HMD device.

27. The HMD of claim 21, wherein the at least one reference visual element is dynamically adapted by replacing the at least one determined visual element with the at least one reference visual element.

28. The HMD of claim 27, wherein the at least one determined visual element is replaced with the at least one reference visual element without breaking a sandbox of an application displaying the content on the HMD device.

29. The HMD of claim 20, wherein the first threshold criteria is dynamically defined based on the vital parameters and the behavioral parameters of the user.

30. The HMD of claim 20, wherein said immersive experience managing unit is further configured to:
monitor the vital parameters of the user while viewing the modified immersive view of the content on the HMD device;
determine that the vital parameters of the meets a second threshold criteria, wherein the second threshold criteria is dynamically defined based on the vital parameters and the behavioral parameters of the user;
generate a non-immersive view of at least one subsequent frame of the content based on the behavioral parameters of the user; and
display the non-immersive view of the at least one subsequent frame of the content on the HMD device.

31. The HMD of claim 20, wherein the HMD device transition from a first state to a second state to display the modified immersive view of the current view and the at least one neighboring viewport of the content based on a state machine.

32. The HMD of claim 31, wherein the first state is an immersive state and the second state is a modified-immersive state.

33. The HMD of claim 31, wherein the state machine identifies a type of graphical element of the content to be displayed on the HMD device and communicate the type of graphical element to facilitate configuration of one of the immersive view and the modified-immersive view on the HMD device.

34. A Head Mounted Display (HMD) device for automatically adapting content, comprising:
a memory unit;
a processor unit, coupled to the memory unit; and
an immersive experience managing unit, configured to
receive vital parameters of a user while displaying the content in a current viewport from a plurality of viewports in an immersive view on the HMD device;
determine whether the vital parameters of the user meet a first threshold criteria and a second threshold criteria; and
cause at least one of:
generate a modified immersive view of the current viewport and at least one neighboring viewport of at least one subsequent frame of the content based on behavioral parameters of the user and displaying the modified immersive view of the current viewport and the at least one neighboring viewport of the at least one subsequent frame of the content on the HMD device when the vital parameters of the user meet the first threshold criteria and does not meet the second threshold criteria, and
generate a non-immersive view of the current viewport and at least one neighboring viewport of at least one subsequent frame of the content based on behavioral parameters of the user and displaying the non-immersive view of the current viewport and the at least one neighboring viewport of the at least one subsequent frame of the content on the HMD device when the vital parameters of the user meet the first threshold criteria and the second threshold criteria.

35. The HMD of claim 34, wherein the first threshold criteria is dynamically defined based on the vital parameters and the behavioral parameters of the user and wherein the second threshold criteria is dynamically defined based on the vital parameters and the behavioral parameters of the user.

36. The HMD of claim 34, wherein generate the modified immersive view of the current viewport and the at least one neighboring viewport of the at least one subsequent frame of the content based on the behavioral parameters comprises:
identify at least one visual element of the content displayed in the current viewport that is causing the vital parameters to exceed the first threshold criteria;
detect the behavioral parameters of the user corresponding to the at least one determined visual element in the current viewport, wherein the behavioral parameters indicate at least one of user phobia of the at least one determined visual element, a disease of a user, a familiarity of the user with the at least one determined visual element, and a historic behavior of the user when the at least one determined visual element is viewed by the user;
determine the at least one neighboring viewport of the at least one subsequent frame of the content comprising the at least one determined visual element;
determine at least one reference visual element corresponding to the at least one determined visual element to be modified based on the behavioral parameters;
modify the content displayed in the immersive view by dynamically adapting the at least one reference visual element at the at least one determined visual element in the current view and the at least one neighboring viewport of the at least one subsequent frame of the content; and
generate the modified immersive view comprising the at least one reference visual elements at the at least one determined visual element of the content in the current viewport and the at least one neighboring viewport of the at least one subsequent frame of the content.

37. The HMD of claim 34, wherein the at least one reference visual element is dynamically determined based on an analysis of the user behavior corresponding to the users historic behavior towards the at least one element available in at least one of the current viewport and the at least one neighboring viewport of the at least one subsequent frame of the content, a type of content available in at least one of the current viewport and the at least one neighboring viewport of the at least one subsequent frame of the content, other elements available in the available in at least one of the current viewport and the at least one neighboring viewport of the at least one subsequent frame of the content, user phobia associated with the at least one element, the type of content and the other elements available in at least one of the current viewport and the at least one neighboring viewport of the at least one subsequent frame of the content, familiarity of the user with the at least visual element and the other elements in at least one of the current viewport and the at least one neighboring viewport of the at least one subsequent frame of the content.

38. The HMD of claim 34, wherein a state machine identifies a type of graphical element of the content to be displayed on the HMD device and communicate the type of graphical elements to facilitate configuration of one of the immersive view and the non-immersive view on the HMD device.

39. A system for automatically adapting content, comprising:
a HMD device displaying an immersive view of the content;

at least one sensor configured to measure vital parameters of a user while viewing the content displayed in a current viewport from a plurality of viewports in the immersive view on the HMD device; and a mobile device configured to:
  receive the vital parameters of the user from the at least one sensor;
  determine that the vital parameters of the user meet a first threshold criteria;
  identify at least one visual element of the content displayed in the current viewport that is causing the vital parameters to meet the first threshold criteria;
  detect behavioral parameters of the user corresponding to the at least one determined visual element in the current viewport, wherein the behavioral parameters indicate at least one of user phobia of the at least one determined visual element, a disease of a user, a familiarity of the user with the at least one determined visual element, and a historic behavior of the user when the at least one determined visual element is viewed by the user;
  generate a modified immersive view by modifying the at least one determined visual element in the current viewport and at least one visual element in at least one neighboring viewport from the plurality of viewports of at least one subsequent frame of the content based on the behavioral parameters of the user; and
  cause to display the modified immersive view of the current view and the at least one neighboring viewport of the content on the HMD device.

40. The system of claim 39, wherein the mobile device is further configured to:
  frequently monitor the vital parameters of the user while viewing the modified immersive view of the content on the HMD device;
  determine that the vital parameters of the user meet a second threshold criteria; and
  generate a non-immersive view of at least one subsequent frame of the content based on the behavioral parameters of the user;
  cause to display the non-immersive view of the at least one subsequent frame of the content on the HMD device.

41. The system of claim 39, wherein generate the modified immersive view comprising the at least one determined visual element of the content modified based on the behavioral parameters of the user comprising:
  determine the at least one neighboring viewport of the at least one subsequent frame of the content comprising the at least one determined visual element;
  determine at least one reference visual element corresponding to the at least one determined visual element to be modified based on the behavioral parameters, wherein the at least one reference visual element is dynamically determined based on an analysis of the user behavior corresponding to the user historic behavior towards the at least one element available in at least one of the current viewport and the at least one neighboring viewport of the at least one subsequent frame of the content, a type of content available in at least one of the current viewport and the at least one neighboring viewport of the at least one subsequent frame of the content, other elements available in the available in at least one of the current viewport and the at least one neighboring viewport of the at least one subsequent frame of the content, user phobia associated with the at least one element, the type of content and the other elements available in at least one of the current viewport and the at least one neighboring viewport of the at least one subsequent frame of the content, familiarity of the user with the at least visual element and the other elements in at least one of the current viewport and the at least one neighboring viewport of the at least one subsequent frame of the content;
  modify the content displayed in the immersive view by dynamically adapting at least one reference visual element at the at least one determined visual element in the current view and the at least one neighboring viewport of the at least one subsequent frame of the content; and
  generate the modified immersive view of the content comprising the at least one adapted reference visual element at the at least one determined visual element of the content in the current view and the at least one neighboring viewport of the at least one subsequent frame of the content.

* * * * *